US009819767B2

(12) United States Patent
Denoual et al.

(10) Patent No.: US 9,819,767 B2
(45) Date of Patent: Nov. 14, 2017

(54) METHOD AND CORRESPONDING DEVICE FOR STREAMING VIDEO DATA

(71) Applicant: CANON KABUSHIKI KAISHA, Tokyo (JP)

(72) Inventors: Franck Denoual, Saint Domineuc (FR); Hervé Le Floch, Rennes (FR); Frédéric Maze, Langan (FR); Jean Le Feuvre, Cachan (FR); Cyril Concolato, Combs la Ville (FR)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/434,741

(22) PCT Filed: Oct. 11, 2013

(86) PCT No.: PCT/EP2013/071370
§ 371 (c)(1),
(2) Date: Apr. 9, 2015

(87) PCT Pub. No.: WO2014/057131
PCT Pub. Date: Apr. 17, 2014

(65) Prior Publication Data

US 2015/0237166 A1 Aug. 20, 2015

(30) Foreign Application Priority Data

Oct. 12, 2012 (GB) .................................. 1218370.3
Apr. 16, 2013 (GB) .................................. 1306897.8

(51) Int. Cl.
*G06F 15/16* (2006.01)
*H04L 29/06* (2006.01)
*H04L 29/08* (2006.01)

(52) U.S. Cl.
CPC ........... *H04L 67/42* (2013.01); *H04L 65/602* (2013.01); *H04L 67/02* (2013.01)

(58) Field of Classification Search
CPC .. H04N 21/858; H04N 21/63; H04N 21/6332; H04N 21/2343; H04N 21/845;
(Continued)

(56) References Cited

U.S. PATENT DOCUMENTS 7,206,804 B1 4/2007 Deshpande et al.
2007/0009100 A1 1/2007 Kikuchi et al.
(Continued)

FOREIGN PATENT DOCUMENTS

EP 1335603 A2 8/2003
EP 1811389 A1 7/2007
(Continued)

OTHER PUBLICATIONS

Mavlankar et al., "An Interactive Region-of-Interest Video Streaming System for Online Lecture Viewing", Proceedings of 2010 IEEE 18th International Packet Video Workshop, Dec. 13-14, 2010, Hong Kong, pp. 1-8.
(Continued)

*Primary Examiner* — Benjamin M Thieu
(74) *Attorney, Agent, or Firm* — Canon USA, Inc. I.P. Division

(57) ABSTRACT

A method for streaming data corresponding to a video, each of a plurality of frames of the video being divided into n spatial tiles, the method includes transmitting, a description file to a client device, the description file including data about a spatial position of each of the n spatial tiles and including data about at least n URLs corresponding to the n spatial tiles, determining by the client device one or more URLs according to the data about the spatial position included in the description file, receiving from the client device, by a server, one or more request messages for requesting one or more spatial tiles, each request message comprising one of the URLs determined by the client device,
(Continued)

and transmitting to the client device, by the server, video data corresponding to the one or more spatial tiles, in response to one or more the request messages.

54 Claims, 18 Drawing Sheets

(58) Field of Classification Search
CPC ........... H04N 21/4728; H04N 21/8456; H04N 21/8586; H04N 21/234327; H04N 21/631
See application file for complete search history.

(56) References Cited

U.S. PATENT DOCUMENTS

2013/0036234 A1* 2/2013 Pazos .................... H04L 12/189 709/231
2013/0060911 A1* 3/2013 Nagaraj ........... H04N 21/23432 709/219
2013/0091251 A1* 4/2013 Walker ............... H04N 21/6125 709/219
2013/0246643 A1* 9/2013 Luby ................ H04N 21/23439 709/231

FOREIGN PATENT DOCUMENTS

EP 2719190 A1 4/2014
WO 2012/168365 A1 12/2012
WO 2013/098319 A1 7/2013

OTHER PUBLICATIONS

ISO/IEC JTC 1/SC 29/WG11, Jan. 5, 2012, ISO/IEC 23009-1, “Information Technology—Dynamic adaptive streaming over HTTP (DASH)—Part I : Media presentation description and segment formats” XP030018824.
Tokumo et al., “DASH: URL anchors for MPD”, International Organization for Standardization, Organisation Internationale Normalisation, ISO/IEC JTC 1/SC 29/WG 11, Coding of Moving Pictures and Audio, Apr./May 2012, Geneva, Switzerland, pp. 1-6 Section 2: Proposal on URL anchors for DASH MPD.

* cited by examiner

```xml
<?xml version="1.0"?>
    <MPD xmlns:xsi="http://www.w3.org/2001/XMLSchema-instance"
     xmlns="urn:mpeg:DASH:schema:MPD:2011"
     xsi:schemaLocation="urn:mpeg:DASH:schema:MPD:2011 DASH-MPD.xsd"
    type="static"
     mediaPresentationDuration="PT3256S"
     minBufferTime="PT1.2S"
     profiles="urn:mpeg:dash:profile:isoff-on-demand:2011">
     <BaseURL>http://cdn1.example.com/</BaseURL>
     <BaseURL>http://cdn2.example.com/</BaseURL>
    <Period>
<!-- English Audio -->
            <AdaptationSet mimeType="audio/mp4" codecs="mp4a.0x40" lang="en"
            subsegmentAlignment="true" subsegmentStartsWithSAP="1">
            <ContentProtection schemeIdUri="urn:uuid:706D6953-656C-5244-4D48-
            656164657221"/>
                <Representation id="1" bandwidth="64000">
                    <BaseURL>7657412348.mp4</BaseURL>
                </Representation>
                <Representation id="2" bandwidth="32000">
                    <BaseURL>3463646346.mp4</BaseURL>
                </Representation>
<!-- Video -->
            <AdaptationSet mimeType="video/mp4" codecs="avc1.4d0228"
            subsegmentAlignment="true" subsegmentStartsWithSAP="2">
            <ContentProtection schemeIdUri="urn:uuid:706D6953-656C-5244-4D48-
            656164657221"/>
                <Representation id="6" bandwidth="256000" width="320" height="240">
                    <BaseURL>8563456473.mp4</BaseURL>
                </Representation>
                <Representation id="7" bandwidth="512000" width="320" height="240">
                    <BaseURL>56363634.mp4</BaseURL>
                </Representation>
                <Representation id="8" bandwidth="1024000" width="640" height="480">
                    <BaseURL>562465736.mp4</BaseURL>
                </Representation>
                <Representation id="9" bandwidth="1384000" width="640" height="480">
                    <BaseURL>41325645.mp4</BaseURL>
                </Representation>
                <Representation id="A" bandwidth="1536000" width="1280" height="720">
                    <BaseURL>89045625.mp4</BaseURL>
                </Representation>
                <Representation id="B" bandwidth="2048000" width="1280" height="720">
                    <BaseURL>23536745734.mp4</BaseURL>
                </Representation>
            </AdaptationSet>
    </Period>
</MPD>
```

```
<AdaptationSet group='1' id='1' mimeType='video/mp4' codecs='hev1'>
  <Role schemeIdUri="urn:mpeg:DASH:tiling:2013" id='T0' value="0,0" grid="1,1" width="640" height="480"/>
  <Representation width="320" height="240" frameRate='30' id='R1' bandwidth='64000'>
    <SegmentList duration='10'>
      <Initialization sourceURL='seg-init.mp4'/>
      <SegmentURL media='seg-64k-tile1.mp4'/>
    </SegmentList>
  </Representation>
</AdaptationSet>
```
862 → 860

871

```
<AdaptationSet group='1' id='1' mimeType='video/mp4' codecs='hev1'>
  <Role schemeIdUri="urn:mpeg:DASH:tiling:2013" id='T0' value="300,200" grid="0,1,1">
  <Representation width="340" height="280" frameRate='30' id='R1' bandwidth='64000'>
    <SegmentList duration='10'>
      <Initialization sourceURL='seg-init.mp4'/>
      <SegmentURL media='seg-64k-tile1.mp4'/>
    </SegmentList>
  </Representation>
</AdaptationSet>
```
872 → 870

873

```
<AdaptationSet group='1' id='1' mimeType='video/mp4' codecs='hev1'>
  <Role schemeIdUri="urn:mpeg:DASH:tiling:2013" id='T0' value="300,200" grid="0,2,2"
    cols="300,400" rows="200,300" width="640" height="480"/>
  <Representation width="100" height="100" frameRate='30' id='R1' bandwidth='64000'>
    <SegmentList duration='10'>
      <Initialization sourceURL='seg-init.mp4'/>
      <SegmentURL media='seg-64k-tile1.mp4'/>
    </SegmentList>
  </Representation>
</AdaptationSet>
```
874 → 875

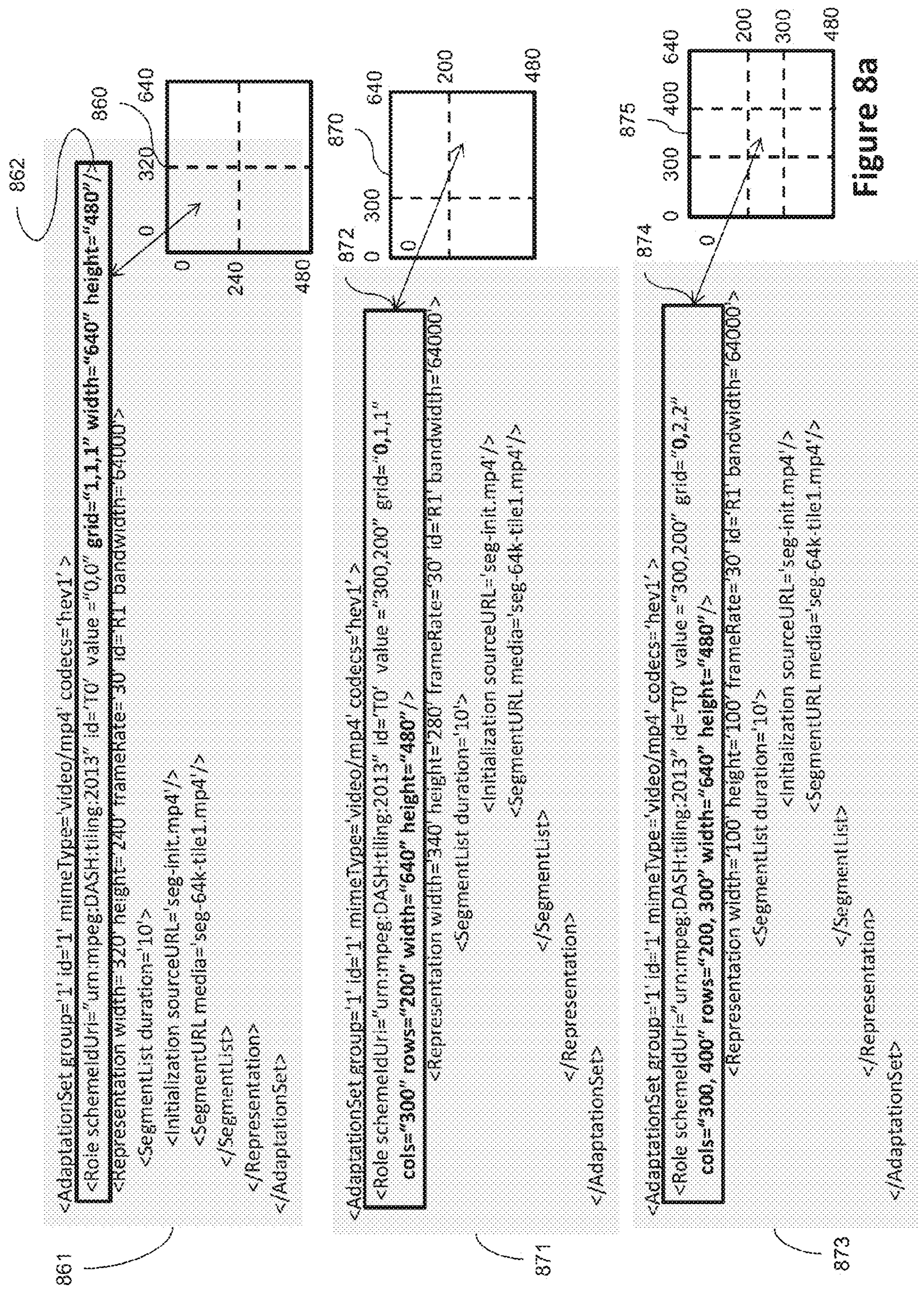

Figure 8a

```
<?xml version='1.0' encoding='UTF-8'?>
<MPD
 xmlns:xsi='http://www.w3.org/2001/XMLSchema-instance'
 xmlns='urn:mpeg:DASH:schema:MPD:2011'
 xmlns:xlink='http://www.w3.org/1999/xlink'
 xsi:schemaLocation='urn:mpeg:DASH:schema:MPD:2011
http://standards.iso.org/ittf/PubliclyAvailableStandards/MPEG-DASH_schema_files/...
... DASH-MPD.xsd'
 minBufferTime='PT10.00S'
 mediaPresentationDuration='PT3256S'
 type='dynamic' availabilityStartTime='2001-12-17T09:40:57Z'
 profiles='urn:mpeg:dash:profile:full:2011'>
 <Period start='PT0S'>
<subset contains= '0 1 2 3'> </subset>
<subset contains= '4 5 6'> </subset>
<AdaptationSet group='1' id='0' >
                    <Representation mimeType='video/mp4' codecs='avc1.644028, ...
...svc1' width='640' height='480'
                              frameRate='15' id='tag0' bandwidth='128000'>
                    <SegmentList duration='10'>
                     <Initialization sourceURL='seg-init.mp4'/>
                     <SegmentURL media='seg-128k-1.mp4'/>
                    </SegmentList>
 </Representation>
</AdaptationSet>
<AdaptationSet group='1' id='1' >
                    <Role schemeIdUri="urn:mpeg:DASH:role:2011" value="main"/>
   900 ----------> <Role schemeIdUri="urn:mpeg:DASH:tiling:2013" Id ="1" value ="0:0"/>
                    <Representation mimeType='video/mp4' codecs='avc1.644028, svc1'...
... width='640' height='480' frameRate='15' id='tag1' bandwidth='128000'>
                    <SegmentList duration='10'>
                     <Initialization sourceURL='seg-init.mp4'/>
                    <SegmentURL media='seg-128k-1.mp4'/>
                    </SegmentList>
     </Representation>
  </AdaptationSet>
  <AdaptationSet group='2' id='2' >
                    <Representation mimeType='audio/mp4' id='tag2' bandwidth='128000'...
... codecs='mp4a.0x40' >
                    <SegmentList duration='10'>
                     <Initialization sourceURL='seg-s-init.mp4'/>
                     <SegmentURL media='seg-s3-128k-1.mp4'/>
                    </SegmentList>
  </Representation>
  </AdaptationSet>
```

```
<AdaptationSet group='2' id='3' >
                    <Role schemeIdUri="urn:mpeg:DASH:role:2011" value="main"/>
      910 ->        <Role schemeIdUri="urn:mpeg:DASH:tiling:2013" Id ="1"/>
                    <Representation mimeType='audio/mp4' id='tag3' bandwidth='128000'
codecs='mp4a.0x40' >
                              <SegmentList duration='10'>
                     <Initialization sourceURL='seg-s-init.mp4'/>
                     <SegmentURL media='seg-s3-128k-1.mp4'/>
                    </SegmentList>
 </Representation>
 </AdaptationSet>
 <AdaptationSet group='3' id='4' >
                    <Role schemeIdUri="urn:mpeg:DASH:role:2011" value="main"/>
      920 ->        <Role schemeIdUri="urn:mpeg:DASH:tiling:2013" Id ="1" value ="1:1"/>
                    <Representation mimeType='video/mp4' codecs='avc1.644028, svc1' ...
...width='320' height='240' frameRate='15' id='tag4' bandwidth='128000'>
                              <SegmentList duration='10'>
                     <Initialization sourceURL='seg-s-init.mp4'/>
                     <SegmentURL media='seg-s1-128k-1.mp4'/>
                    </SegmentList>
 </Representation>
 </AdaptationSet>
 <AdaptationSet group='4' id='5'>
                    <Role schemeIdUri="urn:mpeg:DASH:role:2011" value="main"/>
      930 ->        <Role schemeIdUri="urn:mpeg:DASH:tiling:2013" Id ="1" value ="1:2"/>
                    <Representation mimeType='video/mp4' codecs='avc1.644028, svc1' width='320'
...
...height='240' frameRate='15' id='tag5' bandwidth='128000'>
                              <SegmentList duration='10'>
                     <Initialization sourceURL='seg-s-init.mp4'/>
                     <SegmentURL media='seg-s2-128k-1.mp4'/>
                    </SegmentList>
 </Representation>
 </AdaptationSet>

 <AdaptationSet group='5' id='6' >
                    <Role schemeIdUri="urn:mpeg:DASH:role:2011" value="main"/>
      940 ->        <Role schemeIdUri="urn:mpeg:DASH:tiling:2013" Id ="1"/>
                    <Representation mimeType='audio/mp4' id='tag6' bandwidth='128000' ...
...codecs='mp4a.0x40' >
                              <SegmentList duration='10'>
                     <Initialization sourceURL='seg-s-init.mp4'/>
                     <SegmentURL media='seg-s3-128k-1.mp4'/>
                    </SegmentList>
 </Representation>
 </AdaptationSet>
</Period>
</MPD>
```

Figure 9

```
<?xml version="1.0"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
profiles="urn:mpeg:dash:profile:full:2011"
minBufferTime="PT5.0S"
type="static"
mediaPresentationDuration="PT3256S">
 <BaseURL>http://www.example.com/server/Segments/</BaseURL>

1105 <Period start="PT0.00S" duration="PT3256S">
  <Subset contains="AS1"/>
  <Subset contains="AS2 AS3 AS4 AS5"/>
  <SegmentList duration='10'>
   <Initialization sourceURL='seg-init.mp4'/>
 </SegmentList>

 <!--Description of full-frame video -->
  <AdaptationSet id="AS1" mimeType='video/mp4' codecs='hev1' >
1100 <Role schemeIdUri="urn:mpeg:DASH:role:2011" value="main"/>
   <Representation id='R0' width='1920' height='1080' frameRate='30'...
...bandwidth='256000'>
    <SegmentList duration='10'>
    <SegmentURL media='seg-full-1.mp4'/>
     ...
   </SegmentList>
   </Representation>
  </AdaptationSet>

 <!--Description of first tile -->
 <AdaptationSet id="AS2" mimeType='video/mp4' codecs='hev1' >
  <Role schemeIdUri="urn:mpeg:DASH:role:2011" value="alternate"/>
1101  <Role schemeIdUri="urn:mpeg:DASH:tiling:2013" id='TS1' value =" 0,0,960,540"/>
  <Representation width='960' height='540' frameRate='30' bandwidth='64000'>
   <SegmentList duration='10'>
    <SegmentURL media='seg-tile1-1.mp4'/>
     ...
   </SegmentList>
  </Representation>
 </AdaptationSet>

<!--Description of second tile -->
<AdaptationSet id="AS3" mimeType='video/mp4' codecs='hev1' >
 <Role schemeIdUri="urn:mpeg:DASH:role:2011"
value="alternate"/>
 <Role schemeIdUri="urn:mpeg:DASH:tiling:2013" id='TS1'...
...value =" 960,0,960,540"/>
1102 <Representation width='960' height='540' frameRate='30'
bandwidth='64000'>
  <SegmentList duration='10'>
   <SegmentURL media='seg-tile2-1.mp4'/>
...
  </SegmentList>
 </Representation>
</AdaptationSet>
<!--Description of third tile -->
<AdaptationSet id="AS4" mimeType='video/mp4' codecs='hev1' >
 <Role schemeIdUri="urn:mpeg:DASH:role:2011"...
...value="alternate"/>
 <Role schemeIdUri="urn:mpeg:DASH:tiling:2013" id='TS1' value
="0,540,960,540"/>
1103 <Representation width='960' height='540' frameRate='30'
bandwidth='64000'>
  <SegmentList duration='10'>
   <SegmentURL media='seg-tile3-1.mp4'/>
    ...
  </SegmentList>
 </Representation>
</AdaptationSet>
<!--Description of fourth tile -->
<AdaptationSet id="AS5" mimeType='video/mp4' codecs='hev1' >
 <Role schemeIdUri="urn:mpeg:DASH:role:2011"...
...value="alternate"/>
 <Role schemeIdUri="urn:mpeg:DASH:tiling:2013" id='TS1' value
="960,540,960,540"/>
1104 <Representation width='960' height='540' frameRate='30'
bandwidth='64000'>
  <SegmentList duration='10'>
   <SegmentURL media='seg-tile4-1.mp4'/>
    ...
  </SegmentList>
 </Representation>
</AdaptationSet>
</Period>
</MPD>
```

```
<AdaptationSet id='AS1' mimeType='video/mp4' codecs='hev1' >
<Role schemeIdUri="urn:mpeg:DASH:tiling:2013" id='TS1'  value ="0,0,960,540"/>
 <Representation width='960' height='540' frameRate='30' id='R1' bandwidth='64000'>
  <SegmentList duration='10'>
   <SegmentURL media='seg-tile1.mp4'/>
    ...
  </SegmentList>
 </Representation>
</AdaptationSet>
```

Figure 12

METHOD AND CORRESPONDING DEVICE FOR STREAMING VIDEO DATA

CROSS-REFERENCE TO RELATED APPLICATIONS

The application is the National Phase application of PCT Application No. PCT/EP2013/071370, filed on Oct. 11, 2013 and titled "Method and corresponding device for streaming video data." This application claims the benefit under 35 U.S.C. §119(a)-(d) of United Kingdom Patent Application Nos. GB1218370.3, filed on Oct. 12, 2012 and titled "Method and corresponding device for streaming video data", and GB1306897.8 filed on Apr. 16, 2013 and titled "Method and corresponding device for streaming video data." The above cited patent applications are incorporated herein by reference in their entirety.

FIELD OF THE INVENTION

The invention relates to a method and a device for transmitting media data, and more particularly Web-accessed compressed videos. Preferably, the streaming of media data is made over IP networks (like the Internet) by using the protocol HTTP.

BACKGROUND OF THE INVENTION

A media presentation is usually composed of several media contents such as audio, video or text. They can be sent from a server to a client for being jointly played by the client device. Those media contents are downloaded by the client from a server.

In this context, a new standard called DASH (for "Dynamic Adaptive Streaming over HTTP") has recently emerged (see "ISO/IEC 23009-1, Dynamic adaptive streaming over HTTP (DASH), Part 1: Media presentation description and segment formats"). This standard enables to create an association between a compact description of the content(s) of a media presentation and the HTTP addresses. Usually, this association is described in a file called a manifest file or description file. In the context of DASH, this manifest file is a file also called the MPD file (for Media Presentation Description).

When the MPD file is sent to the client device, the description of each media content can be easily known by the client. By reading the manifest file, the client is aware of the kind of media contents proposed in the media presentation and is aware of the HTTP addresses for downloading the associated media contents. Therefore, it can decide which media content to download (via HTTP requests) and to play (decoding and play after reception of the media data segments).

In addition to this association, the DASH standard proposes to split each media content into small periods of time. The time decomposition is added in the MPD file. Thus it describes the association between HTTP addresses (or URLs) and the compact description of each media content over a small period of time.

The invention focuses on a video description in a manifest file (by taking the DASH MPD as reference). Even if the other elements of the media representation (e.g. audio, text, . . . ) are not directly taken into account, they can easily be incorporated in a more global media description as will be explained below.

The spatial resolution of the video becomes more and more important. In this perspective, 4K2K videos begin to emerge on the market. However, mobile applications cannot display such a resolution with a high quality.

A solution proposes to split the video into tiles. If the user of a mobile application wants to display or focus on sub-parts of the video, only the tiles corresponding to the sub-part are transmitted. This process allows keeping a video portion with a good quality.

In the context of DASH, the known standard "ISO BMFF" ("Base Media File Format") is used to encapsulate media contents into media data segments in order to form the media presentation.

Classically, by using DASH, each track would be described in the manifest as independent media content, even if the track corresponds to a sub-part of the video. There is no way in the manifest to signal that each track is a sub-part of the same video. Indeed current MPD definition doesn't allow describing tiled video. In practice, the user would have to download a first initialization segment (in addition to the manifest) for knowing that each video described in the MPD is a sub-part of a tiled video. Then they would have to download, as a minimum, the beginning of each first media data segment of each video content to retrieve the association between tile locations and video content. The downloading of this initialization information conducts to delays and additional and useless HTTP requests.

In another prior art which is not compatible with the use of DASH, the article "*In packet video* 2010, *An Interactive Region Of Interest Video Streaming System for Online Lecture Viewing*", A. Mavlankar, P. Agrawal, D. Pang, D. Halawa, N. Cheung, B. Girod, proposes a specific manifest ("proprietary manifest") describing tiles for a scalable video. The specific manifest provides an identifier and a piece of location information for each tile. From a URL associated to a base layer, and tiles information provided by the proprietary manifest, an HTTP query is built to access a particular tile, this query being associated to a tile index. This type of HTTP query requires processing at server-side to retrieve, from the HTTP query, the byte-range and consequently the tile to be sent to the client device to fulfill its request. This can be done only by a very specific server.

SUMMARY OF THE INVENTION

The present invention has been devised to address one or more of the foregoing concerns.

According to a first aspect of the invention, there is proposed a method for streaming data corresponding to a given video, each frame of the video being divided into n spatial tiles, n being an integer, in order to create n independent video sub-tracks.

The method comprises:

- transmitting, by a server, a description file to a client device, said description file including data about the spatial organization of the n video sub-tracks and at least n URLs respectively designating each video sub-track,
- selecting by the client device one or more URLs according to one Region Of Interest chosen by the client device or a client device's user,
- receiving from the client device, by the server, one or more request messages for requesting a resulting number of video sub-tracks, each request message comprising one of the URLs selected by the client device, and
- transmitting to the client device, by the server, video data corresponding to the requested video sub-tracks, in response to the request messages.

It is specified that spatial tiles are composed of rows and columns of pixels.

In other words, the first aspect of the invention proposes to include directly the URLs of video sub-tracks in a description file (meaning an MPD in DASH) so that the client is aware of the division of the frames into tiles and is able to directly send URL request messages to the server.

The first aspect of the invention allows the limiting of the number of requests for the streaming of the data between the server and the client device. Moreover, when it receives the description file, the client is already aware of the presence and the spatial organization of the tiles, and consequently, it knows how to display the corresponding video sub-tracks.

In an embodiment, the description file further comprises a URL designating a track corresponding to the full given video, and if the client device does not select any URL according to one Region Of Interest, the server receives from the client device a request message comprising the URL of the full video track and transmits, to the client device, video data corresponding to the full video track in response to the request message.

In an embodiment, the given video is a scalable video comprises a base layer and at least one enhancement layer, said n video sub tracks corresponding to an enhancement layer, and said video further comprising a base layer video track, said description file further comprising the URL of the base layer track, and if the client device selects at least one URL according to one Region Of Interest, it also selects the URL of the base layer, and the server further receives from the client device one request message for requesting the base layer track, said request message including the URL of the base layer track, and the server further transmits, to the client device, video data corresponding to the requested base layer track, in response to the request message.

According to a variant, the given video is a scalable video comprises a base layer and at least one enhancement layer, said n video sub tracks corresponding to an enhancement layer, and each frame of the base layer also being divided into n spatial tiles, each tile of the base layer corresponding to a tile in the enhancement layer, in order to create n independent base layer sub-tracks, and if the client device selects at least one URL according to one Region Of Interest, it also selects the URLs of the corresponding base layer sub-tracks, and the server further receives from the client device one request message for requesting the base layer sub-tracks, said request message including the URLs of the base layer sub-tracks, and the server further transmits, to the client device, video data corresponding to the requested base layer sub-tracks, in response to the request message.

In an embodiment, the configuration of the n spatial tiles is defined in the description file by a grid subdivided into a given number of rows and columns, each one having a pre-determined height and width.

In an embodiment, the configuration of the n spatial tiles defines spatial tiles having a uniform or a non-uniform area.

In an embodiment, each spatial tile is a rectangular region.

In an embodiment, if the spatial tiles have a uniform area, the grid is specified by its number of boundaries in both horizontal and vertical dimensions.

In an embodiment, if the spatial tiles have a non-uniform area the grid is specified by its number of rows and columns and the positions of the borders of the rows and the columns.

In an embodiment, the data are streamed according to the DASH standard, said description file being a Media Presentation Description file.

In an embodiment, each URL designates a segment of track or video sub-track for a pre-defined period of time.

In an embodiment, the configuration of the n spatial tiles being defined for each period of time by using a syntax element relative to an entire period of time.

In an embodiment, the description file comprising a set of parameters defined for each video sub-track for every period of time, the set of parameters including a descriptor which incorporates data about:

a. the type of the track: video track or video sub-track, and/or b. if the track is a video sub-track, the position of the spatial tile and the configuration of the n spatial tiles.

In an embodiment, the description file comprising for every period of time, a set of parameters being defined for each tile and, the set of parameters including a descriptor called a Role element which incorporates data about:

the type of the track: video track or video sub-track, and/or b. if the track is a video sub-track, a reference to the configuration of the n spatial tiles.

In an embodiment, if the track is a video sub-track, the descriptor further comprise a scheme to specify the position of the considered tile relative to the configuration of the n spatial tiles.

In an embodiment, the position of the spatial tile being indicated by referring to the indexes of the rows and the columns of the grid.

In an embodiment, the position of the spatial tile being indicated by referring to the position in pixels of the top-left corner of the tile and the width and height of the tile.

In an embodiment, the position of the spatial tile being indicated by positions in a specified coordinates system.

In an embodiment, the position of the spatial tile being expressed as a spatial Media Fragments.

In an embodiment, the video data corresponds to m videos representing the same content, m being an integer, each of the m videos having a different resolution, and each frame of each video being divided into n spatial tiles, in order to create m*n independent video sub-tracks.

In an embodiment, the description file comprises parameters for video sub-tracks, the parameters including data about the possible or forbidden associations of the different video sub-tracks, said possible or forbidden associations being indicated by an identifier attribute if the data are streamed according to the DASH standard.

This enables the client-side selection of any subset of sub-tracks with guarantee for correct display without the need, in the specific case of tile, of upsampling or downsampling the received data.

In an embodiment, the method further comprises:

acquiring the data corresponding to the given video, compressing the acquired data, encapsulating the compressed data, said encapsulating comprising:

generating a given number of video segment files, each one comprising the data associated to the video and the n video sub-tracks for a given period of time, and generating an initialization segment associated to the media files segments, which comprises initialization data about the video track and the video sub-tracks, and generating the description file from the encapsulated data.

In an embodiment, the description file further comprises a URL associated to the initialization segment.

In an embodiment, the initialization data comprises values indicating the width and the height of each video sub-track.

In an embodiment, the initialization data further comprises a transformation matrix which enables the display of each video sub-track at the right position.

According to another aspect of the invention, it is proposed a method for providing data by a server device to a client device, said data corresponding to a given video, each frame of the video being divided into n spatial tiles, n being an integer, in order to create n independent video sub-tracks.

The method comprises:

generating a description file, said description file including data about the spatial organization of the n video sub-tracks, and at least n URLs respectively designating each video sub-track, transmitting said description file to the client device, and transmitting video data corresponding to a given number of video sub-tracks based on one or more client device or client device user's requests, each request comprising one of the URLs.

In an embodiment, the description file further comprises a URL designating a track corresponding to the full given video, and the server transmits, to the client device, video data corresponding to the full video track based on a client device requests comprising the URL of the full video track.

In an embodiment, the given video is a scalable video comprises a base layer and at least one enhancement layer, said n video sub tracks corresponding to an enhancement layer, and said video further comprising a base layer track, said description file further comprising the URL of the base layer track, and the server further transmits, to the client device, video data corresponding to the base layer track based on a client device requests comprising the URL of the base layer track.

According to a variant, the given video is a scalable video comprises a base layer and at least one enhancement layer, said n video sub tracks corresponding to an enhancement layer, and each frame of the base layer also being divided into n spatial tiles, each tile of the base layer corresponding to a tile in the enhancement layer, in order to create n independent base layer sub-tracks, said description file further comprising the URL of the base layer sub-tracks, and the server further transmits, to the client device, video data corresponding to the base layer sub-tracks based on a client device requests comprising the URL of the base layer sub-tracks.

In an embodiment, the configuration of the n spatial tiles is defined in the description file by a grid subdivided into a given number of rows and columns, each one having a pre-determined height and width.

In an embodiment, the configuration of the n spatial tiles defines spatial tiles having a uniform or a non-uniform area.

In an embodiment, each spatial tile is a rectangular region.

In an embodiment, if the spatial tiles have a uniform area, the grid is specified by its number of boundaries in both horizontal and vertical dimensions.

In an embodiment, if the spatial tiles have a non-uniform area the grid is specified by its number of rows and columns and the positions of the borders of the rows and the columns.

In an embodiment, the data are transmitted according to the DASH standard, said description file being a Media Presentation Description file.

In an embodiment, each URL designates a segment of track or sub-track for a pre-defined period of time.

In an embodiment, the configuration of the n spatial tiles being defined for each period of time by using a syntax element relative to an entire period of time.

In an embodiment, the description file comprising a set of parameters defined for each video sub-track for every period of time, the set of parameters including a descriptor which incorporates data about:

a. the type of the track: video track or video sub-track, and/or b. if the track is a video sub-track, the position of the spatial tile and the configuration of the n spatial tiles.

In an embodiment, the description file comprises for every period of time, a set of parameters being defined for each tile, the set of parameters including a descriptor called a Role element which incorporates data about:

the type of the track: video track or video sub-track, and/or b. if the track is a video sub-track, a reference to the configuration of the n spatial tiles.

In an embodiment, if the track is a video sub-track, the descriptor further comprise a scheme to specify the position of the considered tile relative to the configuration of the n tile.

In an embodiment, the position of the spatial tile being indicated by referring to the indexes of the rows and the columns of the grid.

In an embodiment, the position of the spatial tile being indicated by referring to the position in pixels of the top-left corner of the tile and the width and height of the tile.

In an embodiment, the position of the spatial tile being indicated by positions in a specified coordinates system.

In an embodiment, the position of the spatial tile being expressed as a spatial Media Fragments.

In an embodiment, the method further comprises preliminarily to the step of generating a description file:

acquiring data corresponding to the given video, compressing the acquired data, encapsulating the compressed data, said encapsulating comprising:

generating a given number of media segment files, each one comprising the data associated to the video and the n video sub-tracks for a given period of time, and generating an initialization segment associated to the media files segments, which comprises initialization data about the video track and the video sub-tracks.

In an embodiment, the video data includes m video tracks representing the same content, m being an integer, each of the m video tracks having a given resolution, and each frame of each video track being divided into n spatial tiles, in order to create m*n independent video sub-tracks.

In an embodiment, the description file comprises parameters for video sub-tracks, the parameters including data about the possible or forbidden associations of the different video sub-tracks, said possible or forbidden associations being indicated by an identifier attribute if the data are streamed according to the DASH standard.

According to another aspect of the invention, it is proposed a method for obtaining data corresponding to a given video by a client device, each frame of the video being divided into n spatial tiles, n being an integer, in order to create n independent video sub-tracks. The method comprises:

receiving a description file including data about the spatial organization of the n video sub-tracks and at least n URLs respectively designating each video sub-track, selecting by the client device or client device's user at least one Region Of Interest in the video, obtaining one or more URLs according to the chosen Region Of Interest, based on the description file, and sending one or more request messages for requesting the video sub-tracks, each request message comprising one of the URLs selected by the client device, receiving video data corresponding to the requested video sub-tracks, in response to the request messages.

In an embodiment, the description file further comprises a URL designating a track corresponding to the full given video, and if the client device does not select any Region Of Interest, the method further comprises sending a request message for requesting the full video track and receiving video data corresponding to the requested full video track, in response to the request message.

In an embodiment, the given video is a scalable video comprises a base layer and at least one enhancement layer, said n video sub tracks corresponding to an enhancement layer, and said video further comprising a base layer video sub-track, said description file further comprising the URL of the base layer track, and if the client device chooses one Region Of Interest, and the method further comprises:

obtaining by the client device the URL of the base layer, sending request message which includes the URL of the base layer track, and receiving video data corresponding to the requested base layer track, in response to the request message.

According to a variant, the given video is a scalable video comprises a base layer and at least one enhancement layer, said n video sub tracks corresponding to an enhancement layer, and each frame of the base layer also being divided into n spatial tiles, each tile of the base layer corresponding to a tile in the enhancement layer, in order to create n independent base layer sub-tracks, said description file further comprising the URLs of the base layer sub-tracks, and if the client device chooses one Region Of Interest, and the method further comprises:

obtaining by the client device the URLs of the base layer sub-tracks, sending request message which includes the URLs of the base layer sub-tracks, and receiving video data corresponding to the requested base layer sub-tracks, in response to the request message.

In an embodiment, the configuration of the n spatial tiles is defined in the description file by a grid subdivided into a given number of rows and columns, each one having a pre-determined height and width.

In an embodiment, the configuration of the n spatial tiles defines spatial tiles having a uniform or a non-uniform area.

In an embodiment, each spatial tile is a rectangular region.

In an embodiment, if the spatial tiles have a uniform area, the grid is specified by its number of boundaries in both horizontal and vertical dimensions.

In an embodiment, if the spatial tiles have a non-uniform area the grid is specified by its number of rows and columns and the positions of the borders of the rows and the columns.

In an embodiment, the data are defined according to the DASH standard, said description file being a Media Presentation Description file.

In an embodiment, each URL designates a segment of track or sub-track for a pre-defined period of time.

In an embodiment, the configuration of the n spatial tiles being defined for each period of time by using a syntax element relative to an entire period of time.

In an embodiment, the description file comprising a set of parameters defined for each video sub-track for every period of time, the set of parameters including a descriptor which incorporates data about:

a. the type of the track: video track or video sub-track, and/or b. if the track is a video sub-track, the position of the spatial tile and the configuration of the n spatial tiles.

In an embodiment, the description file comprising for every period of time, a set of parameters being defined for each tile and, the set of parameters including a descriptor called a Role element which incorporates data about:

the type of the track: video track or video sub-track, and/or b. if the track is a video sub-track, a reference to the configuration of the n spatial tiles.

In an embodiment, if the track is a video sub-track, the descriptor further comprise a scheme to specify the position of the considered tile relative to the configuration of the n tile.

In an embodiment, the position of the spatial tile being indicated by referring to the indexes of the rows and the columns of the grid.

In an embodiment, the position of the spatial tile being indicated by referring to the position in pixels of the top-left corner of the tile and the width and height of the tile.

In an embodiment, the position of the spatial tile being indicated by positions in a specified coordinates system.

In an embodiment, the position of the spatial tile being expressed as a spatial Media Fragments.

In an embodiment, the video data corresponds to m videos representing the same content, m being an integer, each of the m videos having a different resolution, and each frame of each video being divided into n spatial tiles, in order to create m*n independent video sub-tracks.

In an embodiment, the description file comprises parameters for video sub-tracks, the parameters including data about the possible or forbidden associations of the different video sub-tracks, said possible or forbidden associations being indicated by an identifier attribute if the data are streamed according to the DASH standard.

69. A method according to any one of claims 48 to 68, wherein the received video data comprises:

a given number of video segment files, each one comprising the data associated to the video and the n video sub-tracks for a given period of time, and an initialization segment associated to the media files segments, which comprises initialization data about the video track and the video sub-tracks.

In an embodiment, the description file further comprises a URL associated to the initialization segment.

In an embodiment, the initialization data comprises values indicating the width and the height of each video sub-track.

In an embodiment, the initialization data further comprises a transformation matrix which enables the display of each video sub-track at the right position.

According to another aspect of the invention, it is proposed a computer program product for a programmable apparatus, the computer program product comprising a sequence of instructions for implementing a method as detailed above when loaded into and executed by the programmable apparatus.

According to another aspect of the invention, it is proposed a computer-readable storage medium storing instructions of a computer program for implementing a method as detailed above.

According to another aspect of the invention, it is proposed a device for streaming data corresponding to a given video, each frame of the video being divided into n spatial tiles, n being an integer, in order to create n independent video sub-tracks, said device having means for implementing a method for streaming data as detailed above.

According to another aspect of the invention, it is proposed a server device for providing data to a client device, said data corresponding to a given video each frame of the video being divided into n spatial tiles, n being an integer, in order to create n independent video sub-tracks, said server device having means for implementing a method for providing data as detailed above.

According to another aspect of the invention, it is proposed a client device for obtaining data corresponding to a given video, each frame of the video being divided into n spatial tiles, n being an integer, in order to create n independent video sub-tracks, said client device having means for implementing a method for obtaining data as detailed above.

BRIEF DESCRIPTION OF THE DRAWINGS

Other particularities and advantages of the invention will also emerge from the following description, the invention being described purely by way of example and being illustrated by the accompanying drawings, in which:

FIG. 4 illustrates a description file/manifest where no sub-track is involved;

FIGS. 8, 8*a* and 8*b* describe different syntaxes of a manifest/description file according to the invention;

FIG. 9 gives a complete example of manifest/description file for a media presentation with video sub-tracks, according to the invention;

FIG. 11 illustrates another example of manifest/description file for a media presentation with video sub-tracks, according to the invention, and FIG. 12 illustrates another syntax used in a manifest/description file for a media presentation with video sub-tracks, according to the invention.

DETAILED DESCRIPTION OF EMBODIMENTS OF THE INVENTION

Figure 1A:
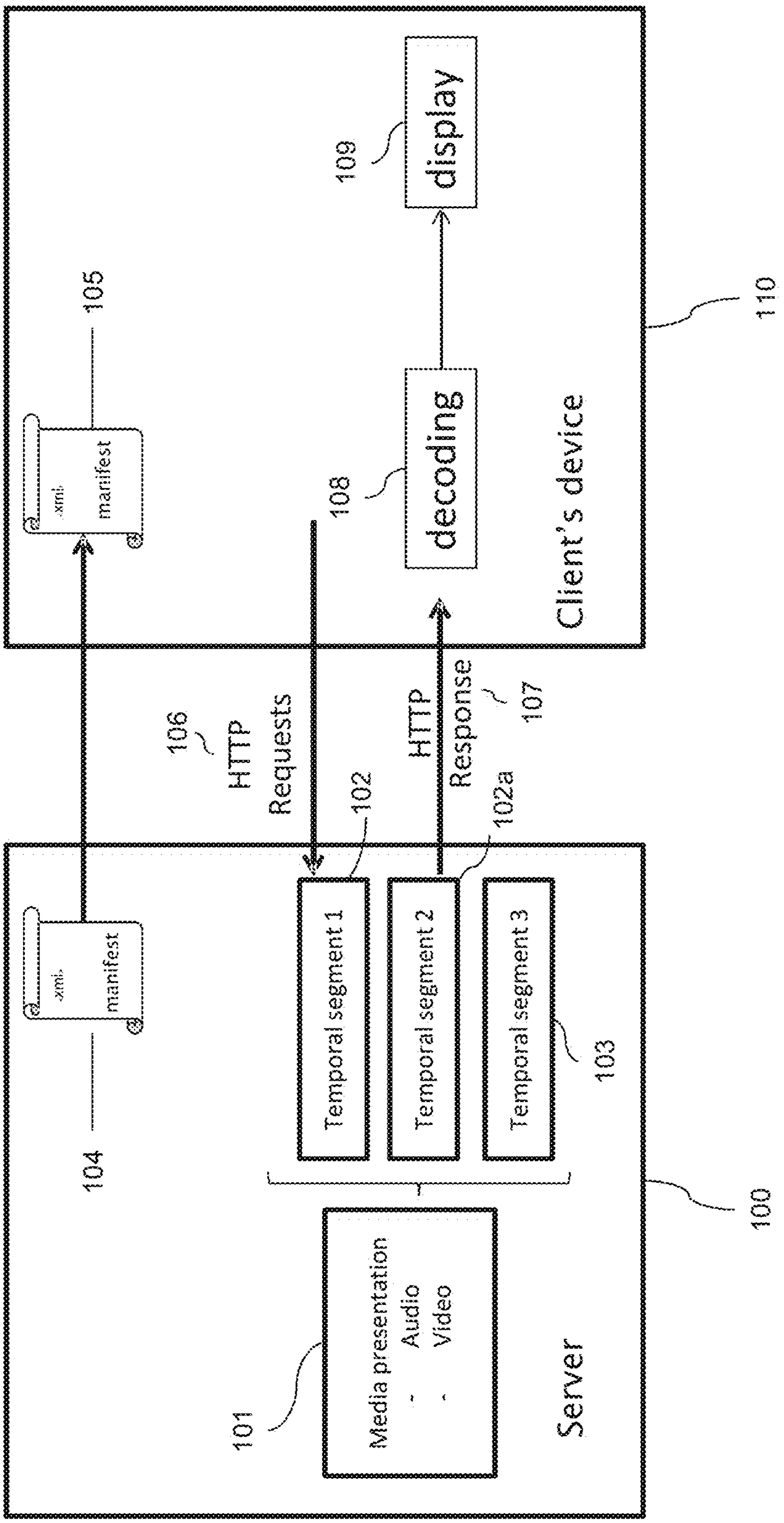
FIG. 1*a* illustrates a block diagram about an example of the general principle of the Media streaming over HTTP.

FIG. 1*a* describes the general principle of the Media streaming over HTTP, like DASH in particular. Most of the new protocols and standards for Media streaming over HTTP are based on this principle.

A media server 100 contains different media presentations. An example of media presentation 101 is illustrated. It contains here audio and video data. It is considered here that the video is integral, meaning it is not divided into tiles. In this example, we consider that audio and video are interleaved in a same file. The way this media presentation is constructed is described below in the FIG. 2. This media presentation has been temporally split into small independent and consecutive temporal segments 102, 102*a* and 103 (for example mp4 segments) meaning that the interleaved audio/video data of the media presentation is split into three consecutive temporal periods. Those temporal segments can be addressed and downloaded independently. The downloading addresses of the media content are HTTP addresses. (One HTTP address associated to each temporal segment of the audio/video media content.) They are set by the server 100 for each one of these temporal segments.

A manifest file 104 (or description file) is an XML document. It describes the content of the temporal media segments e.g. type of media (audio, video, audio-video, text . . . ), coding format, time duration of the segment. Moreover it associates an URL to each media content segment that is described.

The manifest file 104 is sent to a client device 110 related to a client or a user. By reading the received manifest file 105, the client can know the association between temporal segments of the different media content and the HTTP addresses designating the temporal segments. Moreover, the manifest file 105 gives the information about the content (interleaved audio/video in this example) of the media presentation. For instance, the information may include resolution and/or bit-rate.

The client device 110 can therefore emit HTTP requests 106 for downloading the temporal segments that he wants, those temporal segments being described in the received manifest file 105.

As a response, the server 100 sends the requested temporal segments, 107. These temporal segments can be decoded 108 by the client device 110 for display 109.

Figure 1B:
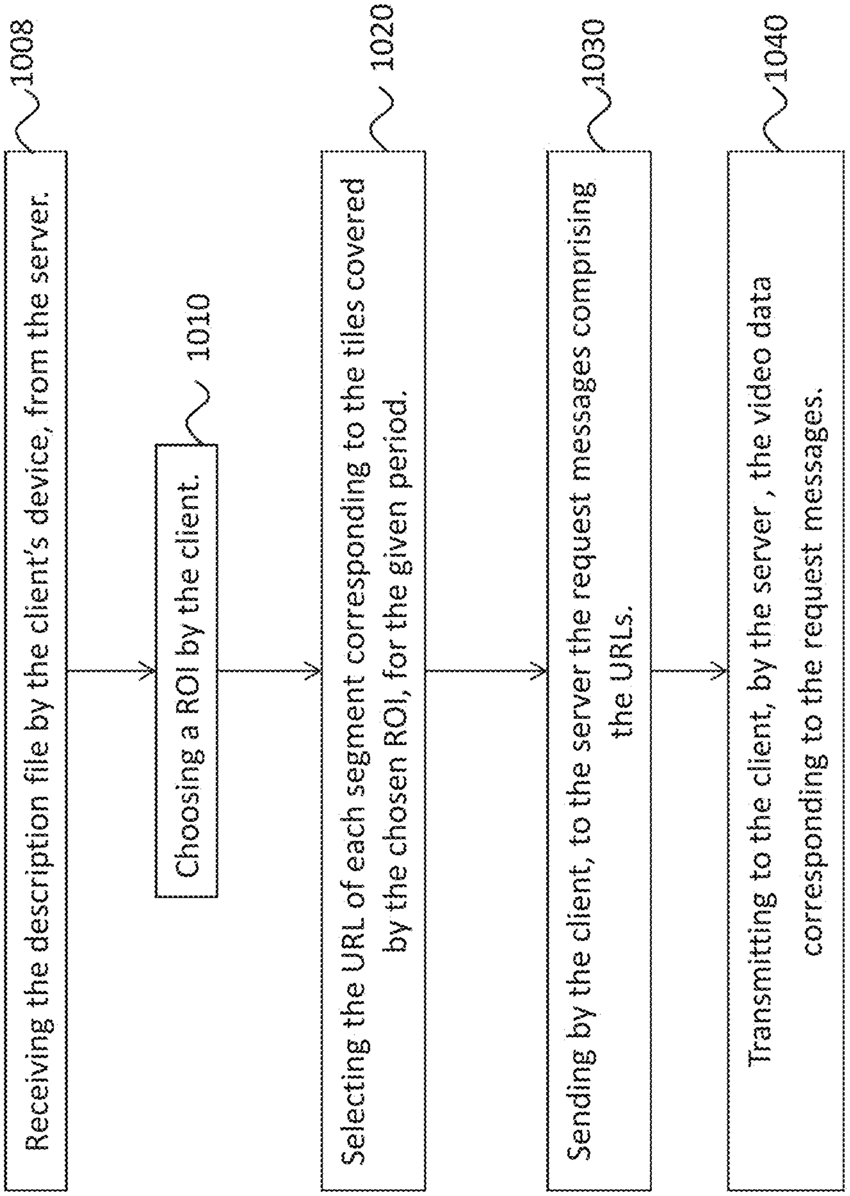
FIG. 1*b* is a flow chart, explaining more in detail the media streaming over HTTP according to an embodiment of the invention, in particular when a frame is divided into tiles.

FIG. 1*b* illustrates more precisely the Media streaming over HTTP (particularly in DASH) according to the invention. It is considered here that the streamed video data includes a video track such that each frame of the video track is divided into n spatial tiles, n being an integer, in order to create n independent video sub-tracks.

First a client device receives a description file (or MPD in DASH) from a server, step 1008. This description file includes data about the spatial organization of the n video sub-tracks and at least n URLs respectively designating the video sub-tracks.

The client chooses a Region of Interest (ROI) that he wants to display. For instance, he wants to zoom in on a specific zone as illustrated in FIG. 1*c*.

Figure 1C:
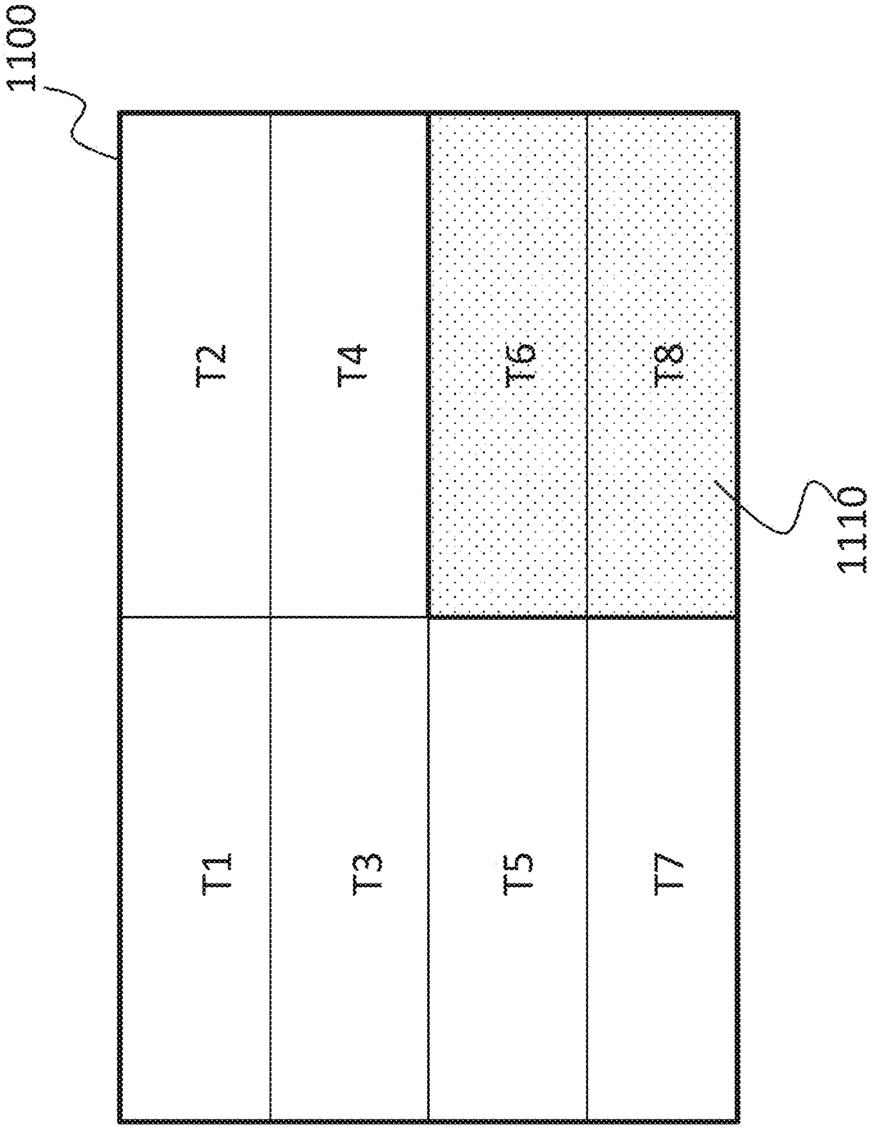
FIG. 1*c* schematically represents a frame divided into tiles and a Region Of Interest, according to an embodiment of the invention.

FIG. 1*c* illustrates a frame 1100 which is here divided into eight tiles T1, T2, . . . , T8. In this frame the client decided to zoom on a portion 1110 at the right bottom part of the image. As illustrated in the FIG. 1*c*, this chosen portion 1110 or ROI is encompassed by two tiles T6 and T8.

Figure 1D:
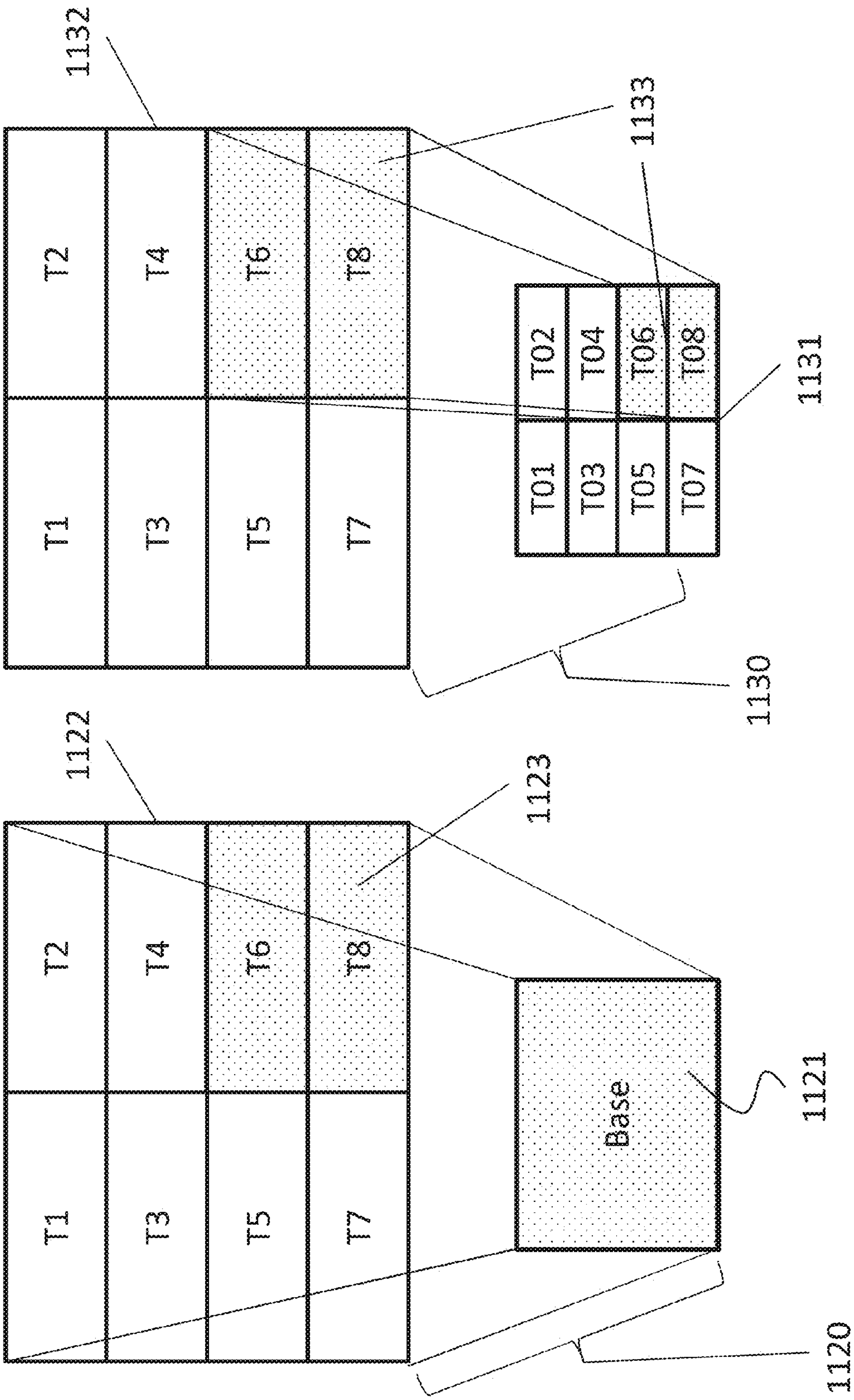
FIG. 1*d* schematically represents a frame from spatially scalable video divided into tiles and a Region Of Interest, according to an embodiment of the invention.

FIG. 1*d* illustrates a frame 1120 which is encoded as a scalable video with a base layer 1121 and a spatial enhancement layer 1122 here divided into eight tiles T1, T2, . . . , T8. The base layer frame 1121 is not tiled, as such each tile in the enhancement layer 1222 depends on the whole base layer. In this frame, when the user decides to zoom on a portion 1123 at the right bottom part of the image 1122, he needs the two selected tiles but also the base layer.

As illustrated in the FIG. 1*d*, this chosen portion 1123 or ROI is encompassed by two tiles T6 and T8 plus the base layer 1121. The right part of the FIG. 1*d* represents a frame 1130 which is encoded as a tiled base layer 1131 and a tiled spatial enhancement layer 1132 with spatial dependencies that are tiled-based: one tile at enhancement layer 1132 depends only on the tiles at the same position in the base layer 1131. In this configuration, when the user selects the ROI 1133, he needs the two selected tiles 1133 plus the two reference tiles T06 and T08 in the base layer 1131.

In FIG. 1*b*, the client chooses an ROI, step 1010, as illustrated in FIG. 1*c* or 1*d*, depending on the video configuration in terms of scalability and tiling.

The URLs corresponding to the tiles covered by the ROI chosen by the client (the URLs of T6 and T8 in the example of the FIG. 1*c*) are selected by the client device, step 1020.

The selection is also based on some compatibility criteria which are developed more in detail later.

Requested messages are sent from the client device to the server, step 1030. Each request message comprises the URL of one tile covered by the ROI chosen by the client. As explained more in detail below, the video sub-tracks corresponding to the tiles are organized into temporal segments. So, one URL designates the video sub-track corresponding to the tile, over a whole segment.

In response to the request messages, the server sends to the client device the video data (meaning the segments as detailed below), step 1040. If video sub-tracks/tiles are requested, the segments designated by the URLs in the request messages are sent to the client device.

Figure 2:
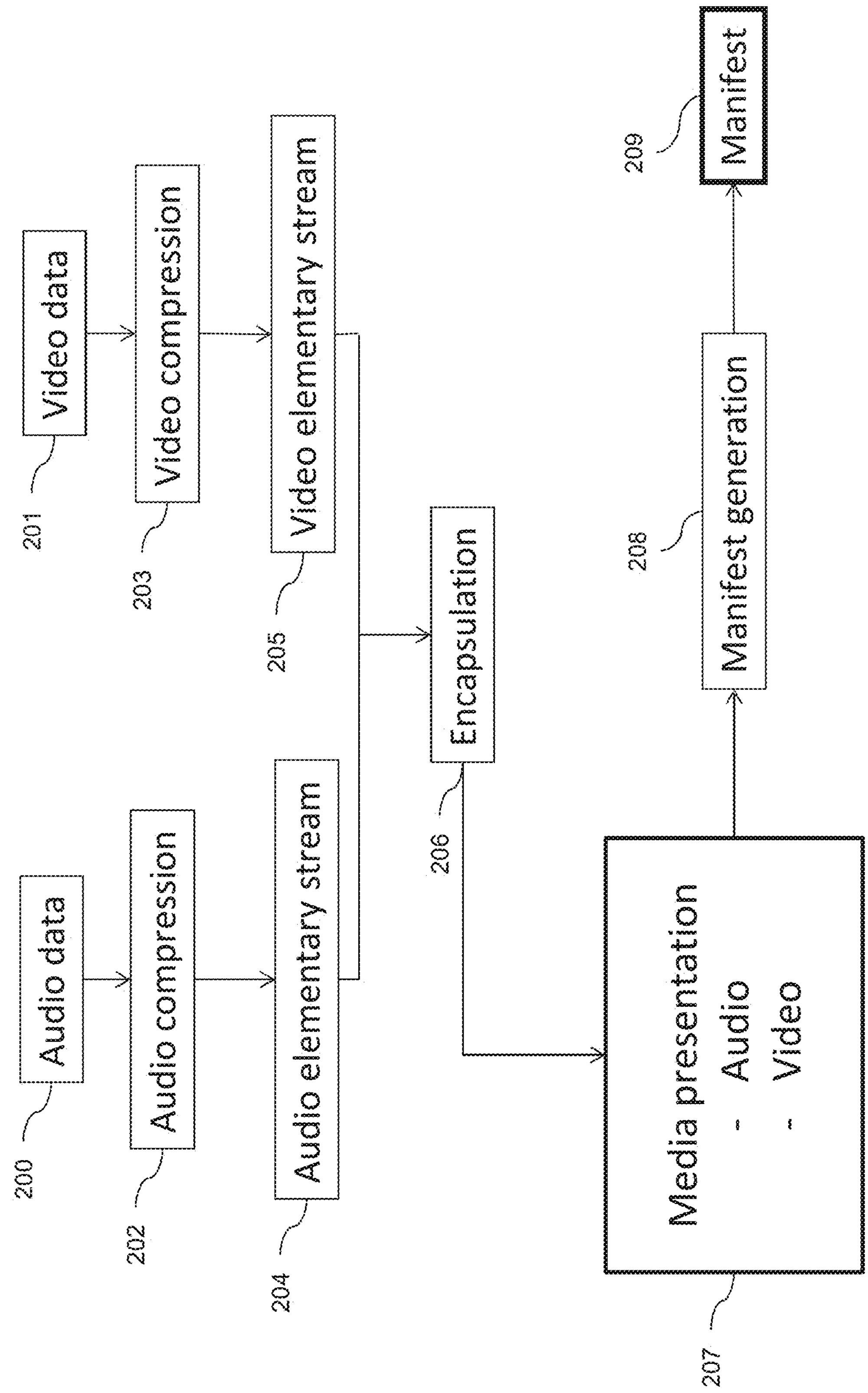
FIG. 2 is a block diagram illustrating en example of the general principle of generating a media presentation and a manifest file.

FIG. 2 illustrates the main steps for the generation of both a media presentation and a manifest file.

In parallel steps 200 and 201, audio and video data are acquired. Then, the audio data is compressed, step 202. For example, the MP3 standard can be used for this step. In parallel the video data is compressed, step 203. Video compression algorithms like MPEG4, AVC, HEVC or SVC can be used. Once the compression stage is conducted, audio and video elementary streams 204, 205 are available.

The elementary streams 204, 205 are encapsulated as a global media presentation, step 206.

A global media presentation 207 results from the encapsulation. For example, the ISO BMFF standard (or the extension of this ISO BMFF standard to AVC, SVC, HEVC . . . ) can be used for describing as a global media presentation the content of the encoded audio and video elementary streams.

The encapsulated media presentation 207 is used for generating, step 208, an XML manifest file 209.

Figure 3:
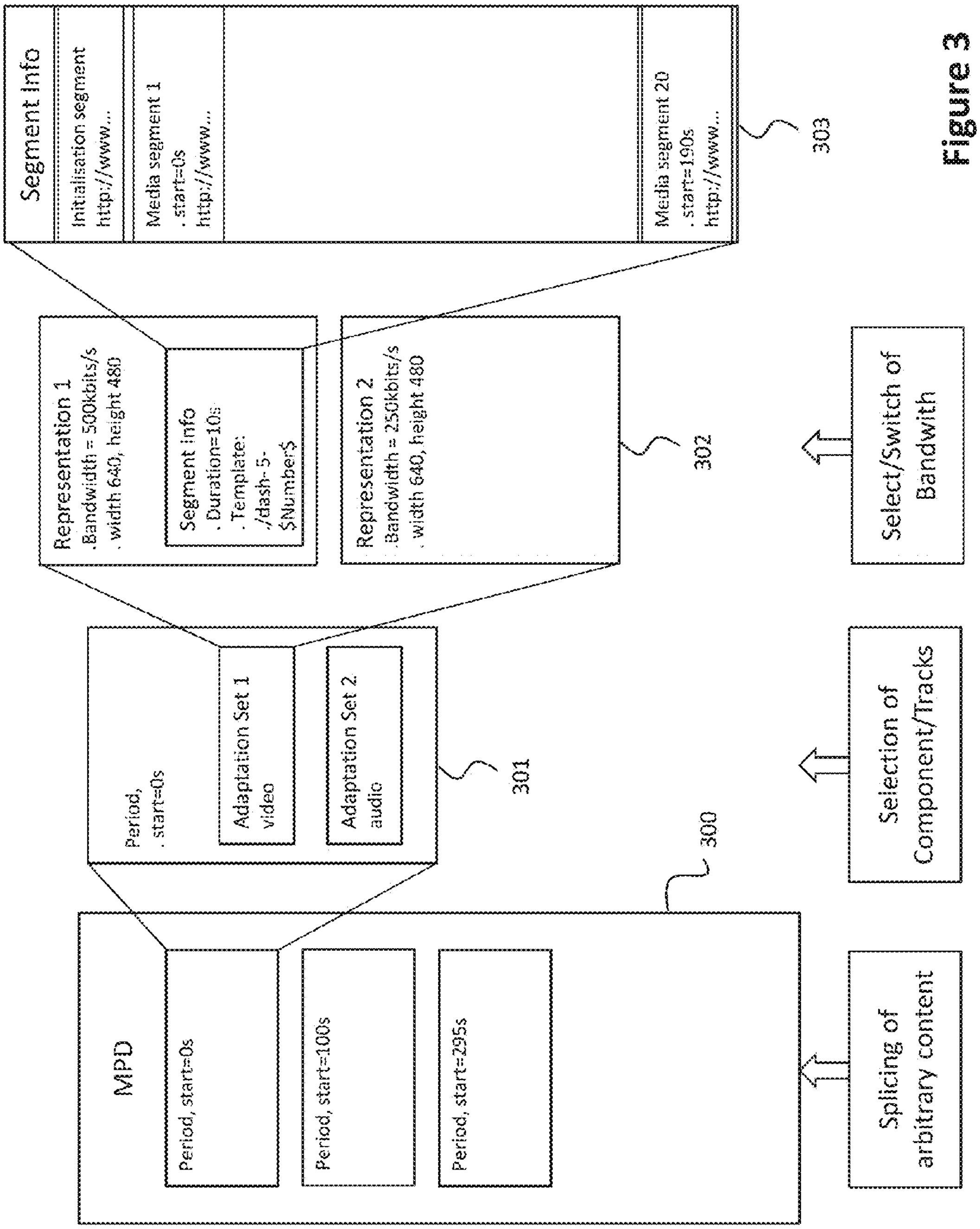
FIG. 3 schematically represents the classical organization of a Media presentation for being streamed using DASH.

FIG. 3 illustrates an example of the hierarchical content of a DASH manifest file. It describes the content of the media presentation available at the server and the association between each media component, also called media data, and the HTTP addresses.

For example, the media presentation may be temporally split into coarse-grained periods called Period (splicing of arbitrary content).

A "Period" at MPD level describes all media components that are available for a period of time (could be the complete duration of the media presentation if there is only one Period). Within this period, a media content component can be composed of several data segments corresponding to small period of time previously mentioned, to allow easy streaming/random accessing/switching.

The XML MPD will contain all the data related to each period. By receiving this information, the client will be aware of the content of each period of time. For example, a Media Presentation 300 is divided into several elements, each one corresponding to a Period. For example the second Period is comprised into 100 s and 294 s.

Each Media Presentation's Period contains data that describes the available media content component for the corresponding period of time. One of the Media Presentation's Period 301 is illustrated more in detail.

In addition several "adaptation set" elements are incorporated: one for video description and one for audio description. Each adaptation set is associated to a given track. In this example, the first group adaptation set is associated to the video track, and the second adaptation set is associated to the audio track corresponding to said video track for the considered time period.

An adaptation set structure 302 contains information about the different possible representations of the encoded video available at the server. In this example, the first representation is an encoded video of spatial resolution 640×480 encoded at the bit rate of 500 kbit/s. The second representation is the same video but encoded at 250 kbit/s. Each of this video can be downloaded by HTTP requests if the client knows the HTTP addresses related to the video. The association between content of each representation and HTTP addresses is done by using an additional temporal sub-layer.

As illustrated by the reference 303, the video representation 302 is split into temporal segments (of 10 seconds in this example).

The first representation 302 gets a bandwidth of 500 kbits/s, a width of 640 pixels and a height of 480 pixels. More parameters are given by the field "Segment Info" 303.

The second representation gets a bandwidth of 250 kbits/s, a width of 640 pixels and a height of 480 pixels. This second representation may represent a decrease in quality compared to the first representation for instance. The client will be able to switch between those representations depending on the available bandwidth on the network.

Each temporal segment 303 is a content stored at the server that is accessible through an HTTP address. In addition, an initialization segment is available. This initialization segment contains MP4 initialization information (if the video has been encapsulated by using the ISO BMFF or extensions) describing the MP4 content of the encapsulated video. For example, it helps the client to instantiate the decoding algorithms related to the video. The HTTP addresses of the initialization segment and the media segments are given in the MPD (or description) file, which is illustrated more in detail below.

FIG. 4 gives an example of known manifest file for a given media presentation. This manifest is a DASH manifest (also called MPD). For more clarity only the main characteristics of the MPD are described here.

In this MPD, two media are described. The first one is an English audio stream and the second one is a video stream. The English audio stream is introduced through the 'adaptation set' banner. Two representations are related to this audio stream:

The first one (with an id equal to "1") is an MP4 encapsulated elementary stream with a bit-rate of 64000 bit/s. The codec for handle this elementary stream (once parsed by an mp4 parser) is defined in the standard by the attribute 'mp4a.0x40'. It is accessible by a request at the relative address: 7657412348.mp4.

The second one (with an id equal to "2") is an MP4 encapsulated elementary stream with a bit-rate of 32000 bit/s.

The adaptation set related to the video contains six representations whose Representation_ids are "6", "7", "8", "9", "A", and "B". These representations contain videos at different spatial resolutions (320×240, 640×480, 1280×720) and at different bit rates (from 256000 to 2048000 bits per second). For each of these representations, a different URL is associated. The client can therefore choose between these representations of the same video according to different criteria like estimated bandwidth or screen resolution for instance.

Now, the following figures focus more particularly on embodiments of the invention.

As previously described, the adaptation set of the manifest file carries (through the representation banner) the information for a same video encoded at different spatial resolutions and at different bit-rates.

The invention allows representations to describe sub-parts of the video. Indeed, in the DASH standard known in the prior art, no attribute for describing sub-parts of the same video is defined. In other words, by using the DASH standard, it is not possible to send directly the absolute or relative localization information for different sub-parts of a video.

In this embodiment (through the following figures), it is shown how this possibility can be added.

Figure 5:
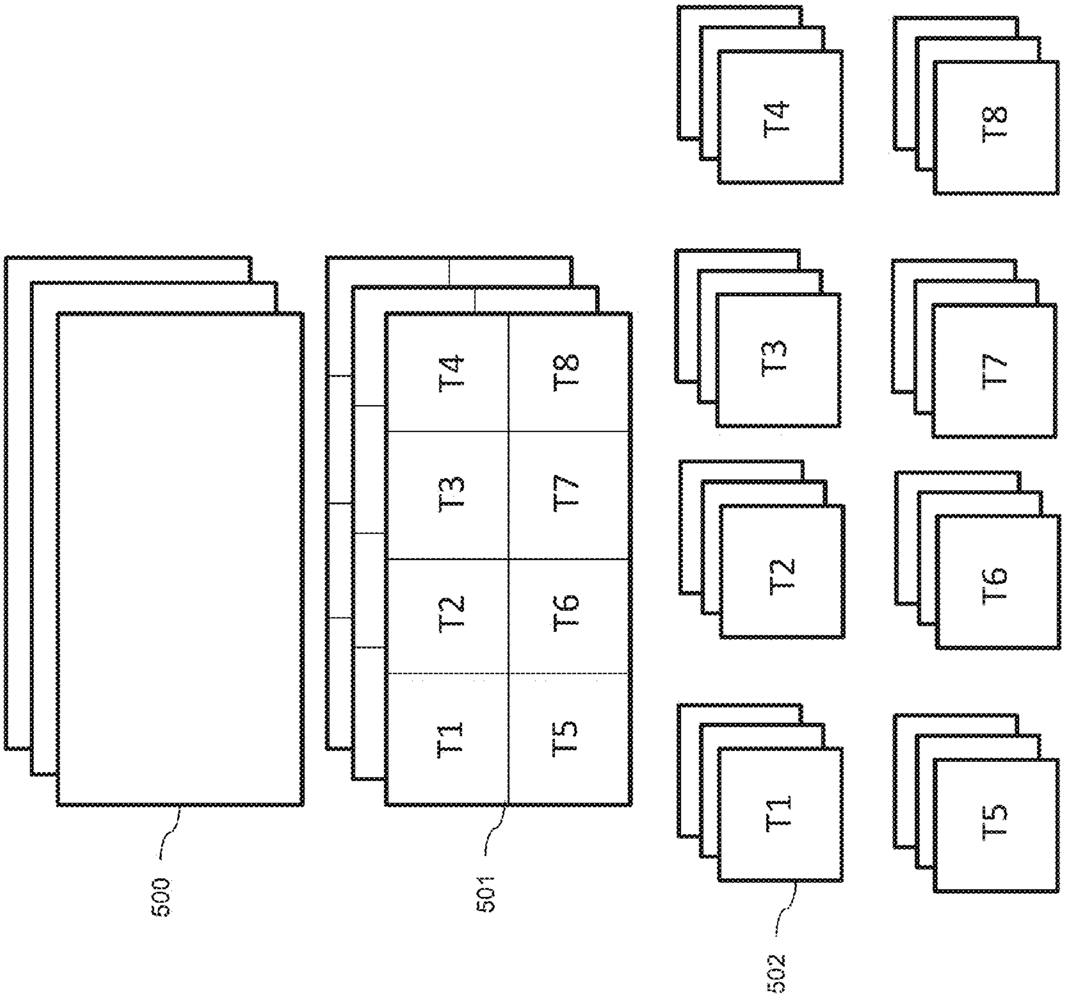
FIG. 5 schematically describes an embodiment for pre-processing an initial video into video sub-tracks according to the invention.

FIG. 5 describes the notion of video tiling and how this notion is applied to a video. A video 500 is symbolized through three frames. Each frame 501 is divided into eight rectangles called Tn (with n varying from 1 to 8). Of course, the number and the shape of the tiles can be different. For example, the tiles of the video can have different dimensions.

However, in this example we consider that the tiling will be the same whatever the index of the video frame 501. We also consider that the tiles have the same horizontal and vertical size.

The result 502 of this tiling is given at the bottom of the FIG. 5. Eight independent video sub-tracks are obtained. These video sub-tracks are partitions of the whole global video. According to a preferred embodiment, these video sub-tracks are considered as independent video and are compressed independently.

It is noticed that the invention could easily apply to a scalable video with one base layer and at least one enhancement layer. In a first embodiment, only the enhancement layer(s) is (are) divided into tiles. Consequently, when tiles are requested, the corresponding base layer is also requested by the client and consequently sent by the server to the client.

In another embodiment, the base layer and the enhancement layers are both divided into tiles. In this case, the URLs of corresponding tiles in each layer can be sent to the server, and in response the server sends to the client device the corresponding tiles in each layer.

Figure 5A:
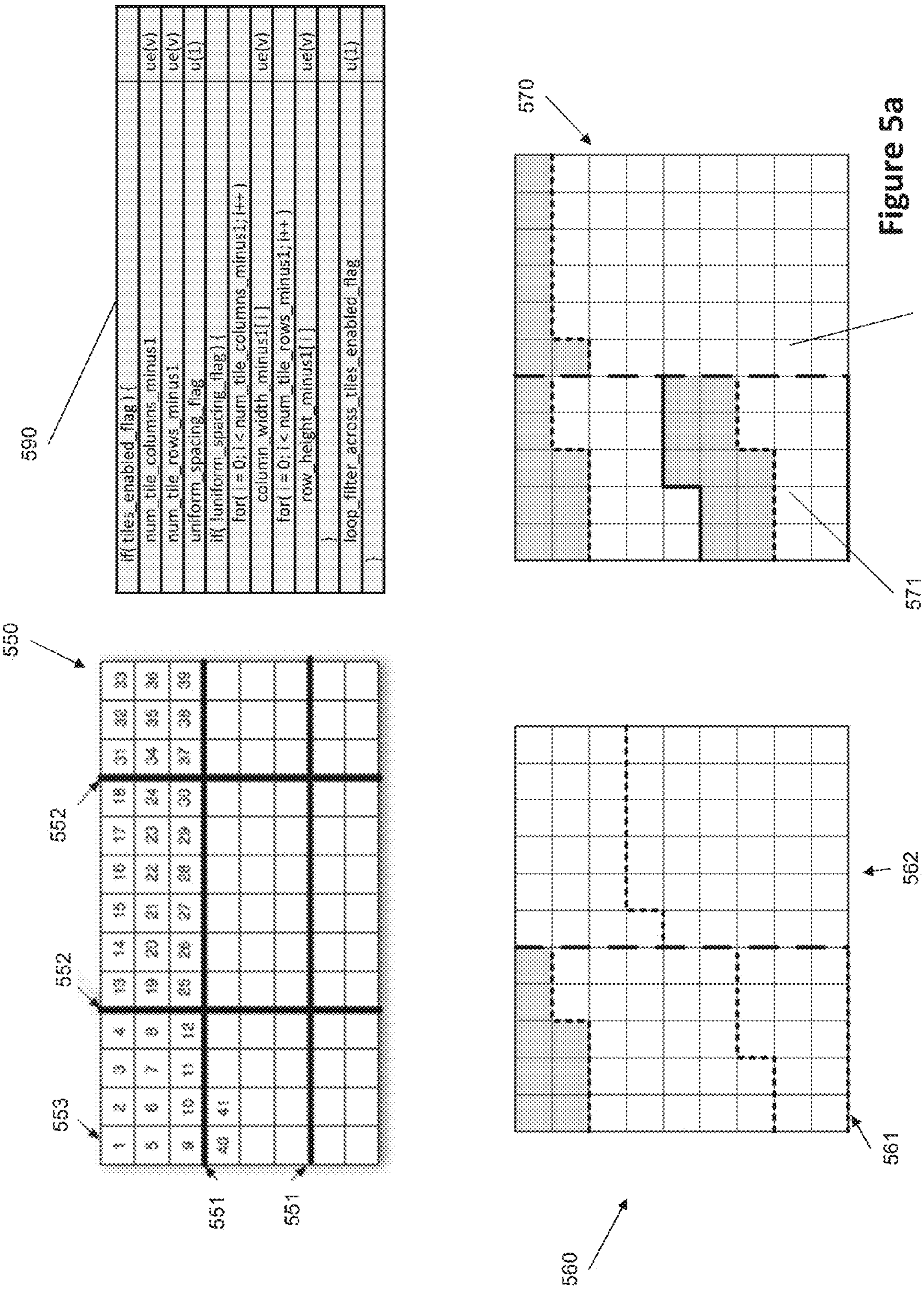
FIG. 5*a* schematically describes the division into slice and slice segment of a tiled video frames.

FIG. 5*a* describes the specific tiles and slices organization in the HEVC format. HEVC standard defines different spatial subdivision of pictures: tiles, slices and slice segments. These different partitions have been introduced for different purposes: the slices are related to streaming issues while the tiles and the slice segments have been defined for being able to do parallel processing.

A tile defines a rectangular region of a picture that contains an integer number of Coding Tree Units (CTU) 553 originally called LCU (Largest Coding Unit) by the man skilled in the art. The tiling is only defined by row and column boundaries 551, 552 as depicted on FIG. 5*a*. This makes the tiles good candidates for regions of interest description in terms of position and sizes. However, the HEVC bitstream organization in terms of syntax and its encapsulation into Network Abstract Layer (NAL) units is rather based on slices (as in Advanced Video Coding).

A slice in HEVC is a set of slice segments, with at least the first slice segment being an independent slice segment, the others, if any, being dependent slice segments. A slice segment contains an integer number of consecutive (in raster scan order) CTUs. It has not necessarily a rectangular shape (thus less appropriate than tiles for ROI representation). A slice segment is encoded in the HEVC bitstream as two parts: a slice_segment_header followed by slice_segment_data.

Independent slice segments and dependent slice segments differ by their header: the dependent slice segment has a shorter header because reusing information from the independent slice segment's header. Both independent and dependent slice segments contain a list of entry points in the bitstream: either to tiles or to entropy decoding synchronization points. An entry point defines a position in a HEVC bitstream. It is identifiable by using a particular code or by being referenced in a table. It corresponds to a particular syntax element: the beginning of a NAL unit or a slice segment for instance.

To better understand the relationships between slice, slice segments and tiles, we illustrate different configurations in 560 and 570, on FIG. 5*a*. These configurations differ from a first configuration 550. The configuration 550 would correspond to a case where one tile has one slice (containing only one independent slice segment). On the second configuration 560, the picture is partitioned in two vertical tiles 561, 562 separated by a bold dashed line and one slice (with five slice segments).

On the right part of the figure, the picture 570 is split in two tiles 571, 572 illustrated by the bold dashed line. The left tile 571 has two slices (each with two slice segments, one dependent and one independent slice segments) delimited by a bold plain line and the right tile 572 has one slice (with two slice segments, one dependent and one independent slice segment). The HEVC standard defines organization rules between tiles and slice segments that can be summarized as follows (one or both conditions have to be met):

All CTUs in a slice segment belong to the same tile.

All CTUs in a tile belong to the same slice segment.

In order to match the Region Of Interest's support and transport, we preferably consider the configuration 550 of FIG. 5*a* where one tile contains one slice with one independent segment. However the encapsulation solution would work with the other configurations 560 or 570.

The tiles are signaled in HEVC bitstream in Picture Parameter Set 590 as shown on FIG. 5*a*. If a regular tiling is used, the parameter "uniform_spacing_flag" takes the value "1" and only the number of tiles columns 551 and rows 552 is required. Otherwise, it is set to "0" and each column and line position is coded in number of coding tree units (typically of size 64×64 pixels).

Figure 6:
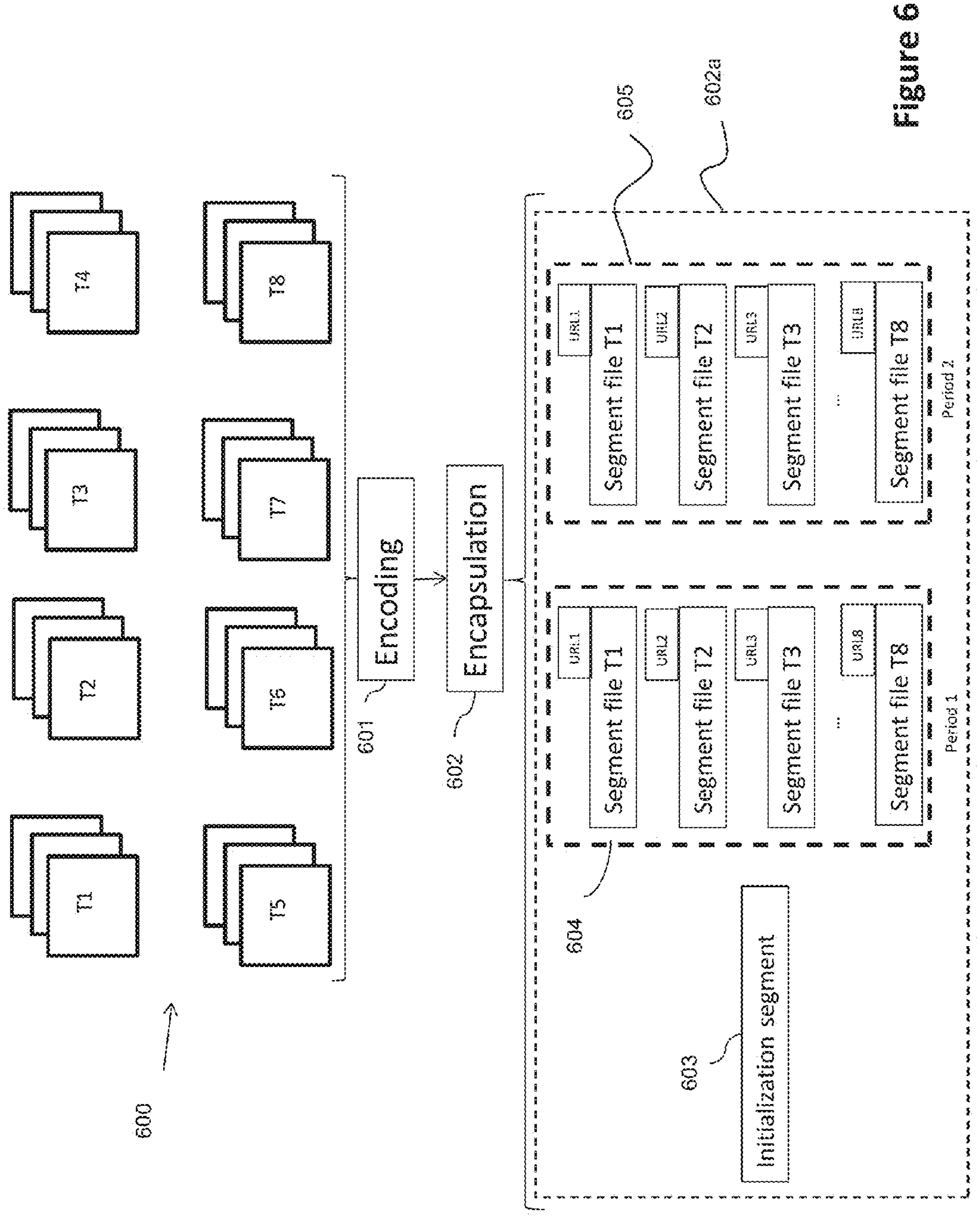
FIG. 6 schematically describes an embodiment for encoding and encapsulating video sub-tracks into a file format, according to the invention.

FIG. 6 shows the encapsulation stage. Before being streamed, the data corresponding to each tile must be processed for being encapsulated in a standard format.

Data corresponding to the eight tiles are acquired, step 600 for being the input of the encoding step 601. The data corresponding to each tile is independently compressed and encoded, step 601. Any video compression algorithm can be used. For example, H264, HEVC, MPEG-2 can be used. Once the data corresponding to the tiles is encoded, step 601, the resulting elementary streams have to be encapsulated in a file format. The ISO BMFF (or the extension of this media file) can be used (as proposed in the standard DASH).

In following those eight video tracks containing the eight sub-part of the video will be referred as "video sub-tracks". As data corresponding to eight video sub-tracks have been encoded, eight video sub-tracks will be defined in the ISO BMFF file. The whole eight video sub-tracks can be viewed as different tracks of a same media presentation. Of course, additional tracks like audio or text tracks could be used. However, for more clarity, we will not describe the insertion of other kind of media in this figure.

First, during an encapsulation process 602, a media presentation 602*a* is generated. A piece of location information is set in an initialization segment 603. This initialization segment contains the initialization data associated to the corresponding video sub-tracks. Among these data, the location of each video sub-track is preferably specified (as described more in detail in the next figure).

In addition to the initialization segment 603, the encapsulation process 602 generates a set of segment files 604, 605 (media segments that can could be accessed through an URL when the MPD will be generated) that correspond to small periods of time. In the example of this figure, two small periods of time are defined. It means that each video sub-track is temporally split into two small periods of time. A different set of segment files is attributed to each video sub-track for a given period of time. By using such a process, the client could request any of the proposed video sub-tracks for any proposed period of time.

The first set of media segments 604 correspond to the different tracks (sub-video) for a first period of time. The second set of media segments 605 are related to the second and following period of time for the same video tracks. Of course, the invention is not limited to two periods of time. The number of periods of time is not limited. It is noticed that the box 604 and 605 are represented with dotted lines, given that they are not existing containers.

An URL is associated to each segment file so that a client can request the tiles covered by a selected ROI as described below.

It is noticed that in the FIG. 3, two temporal decompositions are described:

In the block 300, the splicing of arbitrary content, and

In the blocks 302/303, the generation of small periods of time.

In the FIG. 6, we have considered that the splicing of arbitrary content generates only one global period and data corresponding to each video sub-track is encapsulated into two media segments corresponding to two small periods of time.

Figure 7:
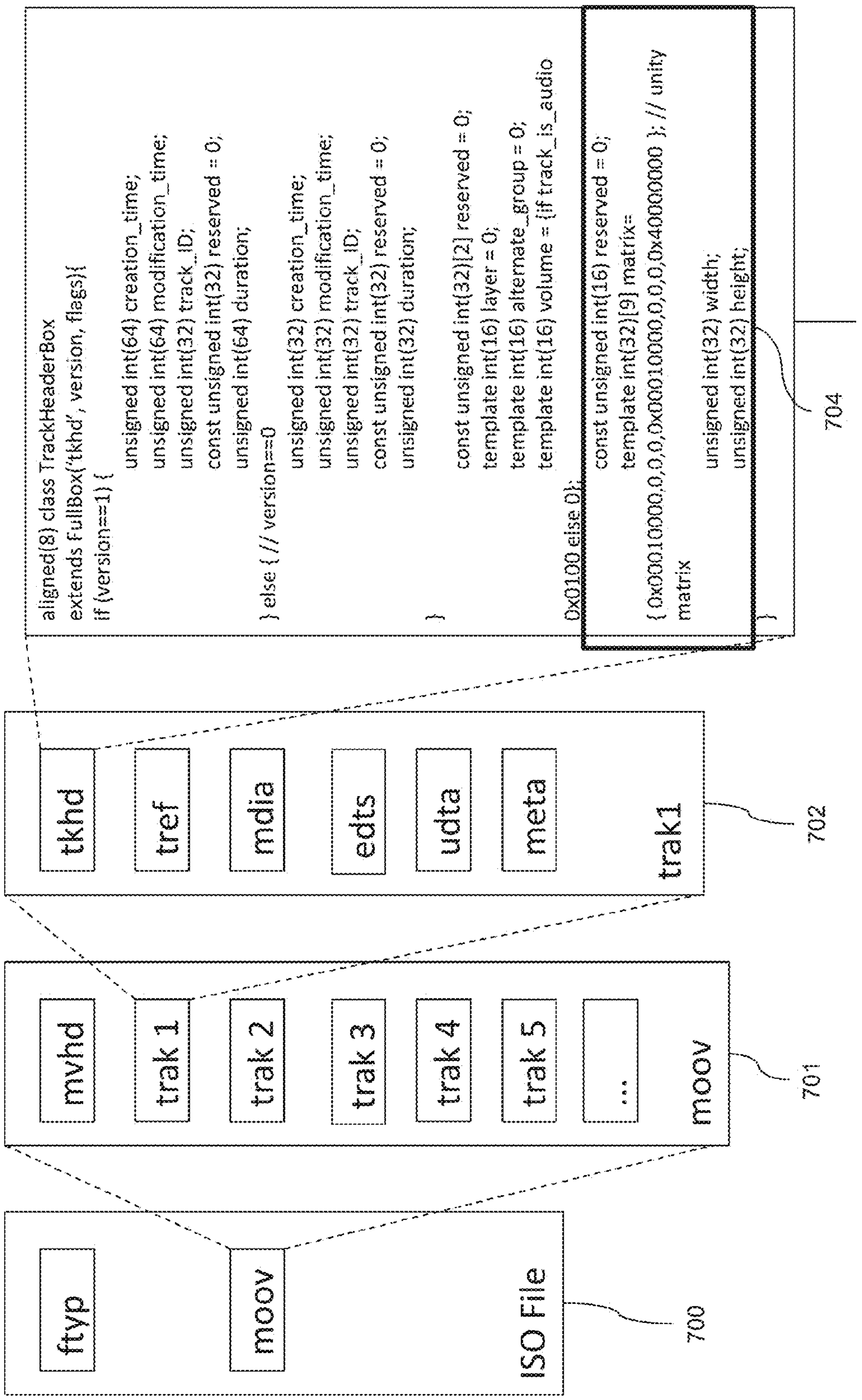
FIG. 7 schematically describes an embodiment of the boxes of the file format that can be used for carrying the location of each video sub-track, according to the invention.

FIG. 7 shows how the initialization segment referenced 603 in the FIG. 6 can be constructed for carrying the location of each video sub-track. It is recalled that the video sub-tracks are video tracks in the syntax of the file format. The initialization segment is an ISO file 700.

As defined in the ISO BMFF standard, this file contains several boxes. The known boxes are not described for more clarity. As eight video sub-tracks (meaning eight video tracks) are defined in this example, a 'moov' box of the encapsulated media presentation shall contain eight "trak" boxes 701.

An example of this "trak" box is referenced 702. It is associated with the first video sub-track. This 'trak' box also contains several boxes. A first box "tkhd" 703 is used for carrying the location of the video sub-track. This box contains several attributes. An attribute used in particular in this invention is a matrix 704. This matrix contains the width and height of the video sub-track and a deformation matrix that enables to display the corresponding track at the right position.

The parameters of this matrix given in the FIG. 7 are just example. These parameters must be tuned according to the shape of the different video sub-tracks: this matrix is fulfilled so that the simultaneous display of the video sub-tracks covers the area of the initial video referenced 500 in the FIG. 5.

Figure 8:
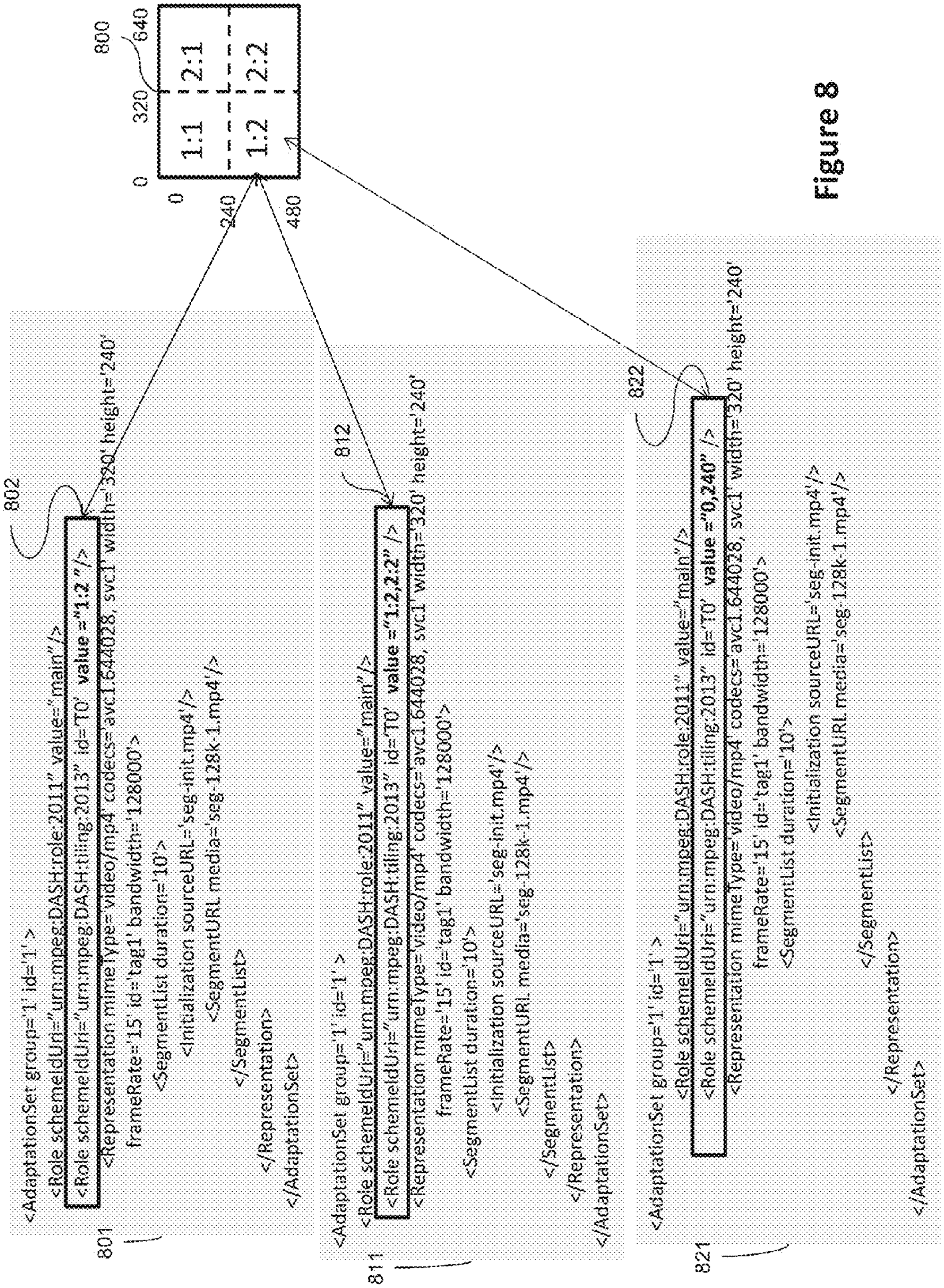

FIG. 8 illustrates a description file (or MPD in the DASH standard). In the DASH standard, the syntax of the manifest (the MPD syntax) does not allow to take into account the notion of tiles.

The FIG. 8 shows the elements that may be included in the manifest/description file (the DASH MPD) for notifying the client about the presence and the locations of the different video sub-tracks. A partial view of a MPD is given in the FIG. 8.

An example of a tiled video frame 800 is represented on the left part of the MPD in order to link a tile to its representation in the MPD. In this example, the tiled video frame comprises four tiles 1:1, 1:2; 2:1 and 2:2, their width and height being indicated on the left and top side of the tiled video frame 800.

A partial view 801 describes an adaptation set that contains information about a video sub-track. Only data related to one video sub-track is displayed in this figure for more clarity. So, the other sub-videos are not described. However, the description of the other sub-videos is similar (it used the same syntax but with other URLs).

The adaptation set ("AdaptationSet") 801 is used to describe one video sub-track which is a tile of the whole initial video. This adaptation set contains one representation of one video sub-track, this representation being defined by criteria like resolution but also frame rate or bandwidth for instance. Those criteria allow the client device to select or not several representations of video sub-tracks together or successively. Indeed, in an embodiment, a video sub-track with a first value of resolution or frame rate cannot be selected with another sub-track having a second value of resolution or frame rate.

In the adaptation set 801, an additional element (compared to the prior art) is proposed for signaling that this adaptation set represents a video sub-track in the media presentation. This additional element is a new scheme 802 that signals both the presence and the location of the tile corresponding to a video sub-track.

In particular, according to the invention, a new scheme for the 'Role' descriptor of the DASH standard is proposed. This new scheme of the "Role" descriptor is defined through the "schemeIdUri" attribute. A new type called "tiling" is defined for the "schemeIdUri" attribute. In addition, the new type of the schemeIdUri is completed by additional attributes, which are used to indicate which tile amongst the existing tiles is represented.

In other words, if N tiles are available, the attribute "schemeIdUri" of the Role descriptor is equal for example to "urn:mpeg:dash:tiling:2013" (any value provided that is unique in the context of DASH). Then the Role descriptor signals via its attributes the tiles that can be put together and the location of each of these tiles. A preferred syntax of this new scheme in the role descriptor is the following one:

<Role schemeIdUri="urn:mpeg:DASH:tiling:2013" Id='T' value="x:y"/>.

The attribute "Id" is an identifier attribute indicating the possible or forbidden associations.

The variable 'T' identifies a set of tiles that can be merged together. A same 'Id=T' variable means that the tiles are issued from the same initial video, meaning with the same resolution. As a consequence, they can be streamed together for being assembled by the client. The variable 'Id=T' is optional. By default, if not present, all defined tiles can be composed together (they are issued of the same initial video). 'T' is an integer.

The attribute "value" allows identifying the position of the tile(s). The integer 'x' and 'y' signal the horizontal and vertical location of the current tile among the set of tiles from left to right and up to bottom. The integers 'x' and 'y' are strictly positive. For example, if the initial video has been split into two horizontal lines of tiles and if each horizontal line is split into four columns of tiles (eight tiles are generated), a value="3:2" means that the tile is on the third column and on the second line. If the 'x' and 'y' values are set to "0", it means that the video associated to the scheme is a non-tiled version of the initial video, i.e. it is the full-frame video. By default if the tiling role is not present, a video is a non-tiled video. It may be useful when there is a risk of confusion in MPD interpretation.

In this example, the value of the scheme 802 designates the video associated to the tile "1:2".

Optionally, the proposed scheme can also be used for media components (or media data) that are not video (but for instance audio or text) when it is necessary to clarify the grouping of non-video media components with tiled video components. In such a case, only the Id value has to be used. A same Id for different media components enables to make the association between them (the different media components can be played simultaneously).

In this preferred embodiment, the "value" attribute is composed of two integer values. However, other variants could exist. For example, the syntax of the value attribute could be:

value="x:X:y:Y" or coma separated: value="x:X,y:Y" or whatever separator character between horizontal and vertical positions as on example 812, with the following signification:

'x' signals the horizontal location of the tile (index of the tile) amongst the whole set of columns;

'X' signals the number of columns;

'y' signals the vertical location of the tile (index of the tile) amongst the whole set of lines; and 'Y' signals the number of lines.

For example, in reference to the FIG. 5, the signaling of the tile T6 will be:

<Role schemeIdUri="urn:mpeg:DASH:tiling:2013" Id='1' value="2:4:2:2"/> or coma separated: schemeIdUri="urn:mpeg:DASH:tiling:2013" Id='1' value="2:4,2:2"/> or whatever separator character between horizontal and vertical positions. The value of the scheme 812 designates the video associated to the tile "1:2" and provides the information that the tiling is a 2×2" grid.

In the example illustrated by the video frame 800, the initial video is split into tiles of same size as it is explained below in FIG. **8*a***. However, this is not restrictive. Tiles could have different sizes. For example, tiles could be generated from a quadtree partition. In such a case, the syntax of the @schemeIdURI equal to "urn:mpeg:dash:tiling:2013" should take into account the nature of the tile partition. The new syntax could be:

<Role schemeIdUri="urn:mpeg:DASH:tiling:2013" Id='T' value="coordinates" coordinate_system="C"/>.

The "coordinates" would be a value (or a set of values) that could be identified from the optional identifier of the coordinate system (the value "C" in this example). An example of coordinate system could be to define absolute location of the tile in pixels, actually the default case. Coordinates would be the location (x, y) in pixels of the top-left corner of the tile. When no "coordinate_system" attribute is specified, it is assumed that coordinates given in the attribute "value" are expressed into pixel positions, unless a ':' character is present in the value that indicates positions in the tiling grid. Size of the tile would be defined by the standard attributes width and height of the representation. For example, in a code portion referenced 821 in the FIG. 8, the tile position is signaled using pixel coordinate system using syntax value="x, y". In a line referenced 822, the tile with top-left corner at position column=0, row=240 is described. All code portion examples 801, 811, 821 provide tile position with or without tiling information. The tile size has to be parsed from the associated "Representation" element.

FIG. **8*a* provides alternative signaling of tiles positions and sizes in the particular context of HEVC tiles. In the right part of this FIG. 8*a*, three examples 860, 870 and 875** of a tiled video frame are provided. Each one corresponds to a specific configuration as detailed below.

As explained in reference to FIG. **5*a*, HEVC tiles are signaled in the bitstream via tile rows and columns borders positions (for instance, back to the FIG. 5*a*, the tiled video frame referenced 550 shows two rows 551 and two columns 552 borders, leading to a 3×3 tiling configuration). As such, it is proposed to put in the "Role" element 862 describing a tile, the tiling organization as in the example 861 in the FIG. 8*a***. In this example, an attribute "grid" is used to indicate as first value whether the tiling is regular or not. This directly translates in MPD the uniform_space_flag from the HEVC bitstream defined in the HEVC standard.

When the tiling is regular as in the tiled video frame 860, the other values in the grid attribute provide the number of tile columns minus 1 and the number of tile rows minus 1 (as encoded in the HEVC bitstream). This number of tiles in the horizontal dimension is directly computed from the HEVC bitstream parameter num_tiles_columns_minus1 and the number of tiles in the vertical dimension is directly computed from the HEVC bitstream parameter num_tiles_rows_minus1 (defined in the HEVC Standard), as in the line referenced 862 for the tiled video frame 860. This notation enables to directly translate HEVC Picture Parameter Sets' values in the MPD (num_tiles_columns_minus1 and num_tiles_rows_minus1). In addition to the grid attribute, the sizes of the full-frame video are required to be able to compute the tiles sizes and positions (see the line referenced 862).

In case the tiling is not uniform, as represented on the tiled video frames 871 or 873, the grid attribute with first value being equal to 0 implies that the "Role" element must allow retrieving the list of positions for each column and the list of positions for each row, given in pixels. In such case, the number of tile borders defining the rows and columns is contained in the subsequent values of the "grid" attribute.

The tiled video frame 872 provides possible names for the attributes to indicate the row and column borders positions (it could be different names however without affecting the invention at both generation and parsing times). Row and column border positions are specified into pixels (see the line 872) with the width and height of the full-frame video.

As another embodiment (not represented), for regular tiling, the grid and width and height attributes can be simplified into one single attribute like for example, grid="w, h, W, H" where w and h respectively provides the size (width and height in pixels) of a tile and W, H the size in pixels of the full-frame video. Applied to the examples 861, 862, this leads to grid="320, 240, 640, 480". It has the advantage to makes an easier to parse syntax for DASH clients (one attribute providing all the 4 values instead of three different attributes in 862).

Another embodiment for the tiling configuration signalization is to have the tiling information at a highest level of signalization. Thus, it can be described once and used from all the fields "Representation" associated to a tile. This reduces the description cost and the size of the manifest potentially reducing the download time of the manifest and reducing the startup delay of the streaming application.

Figure 8B:
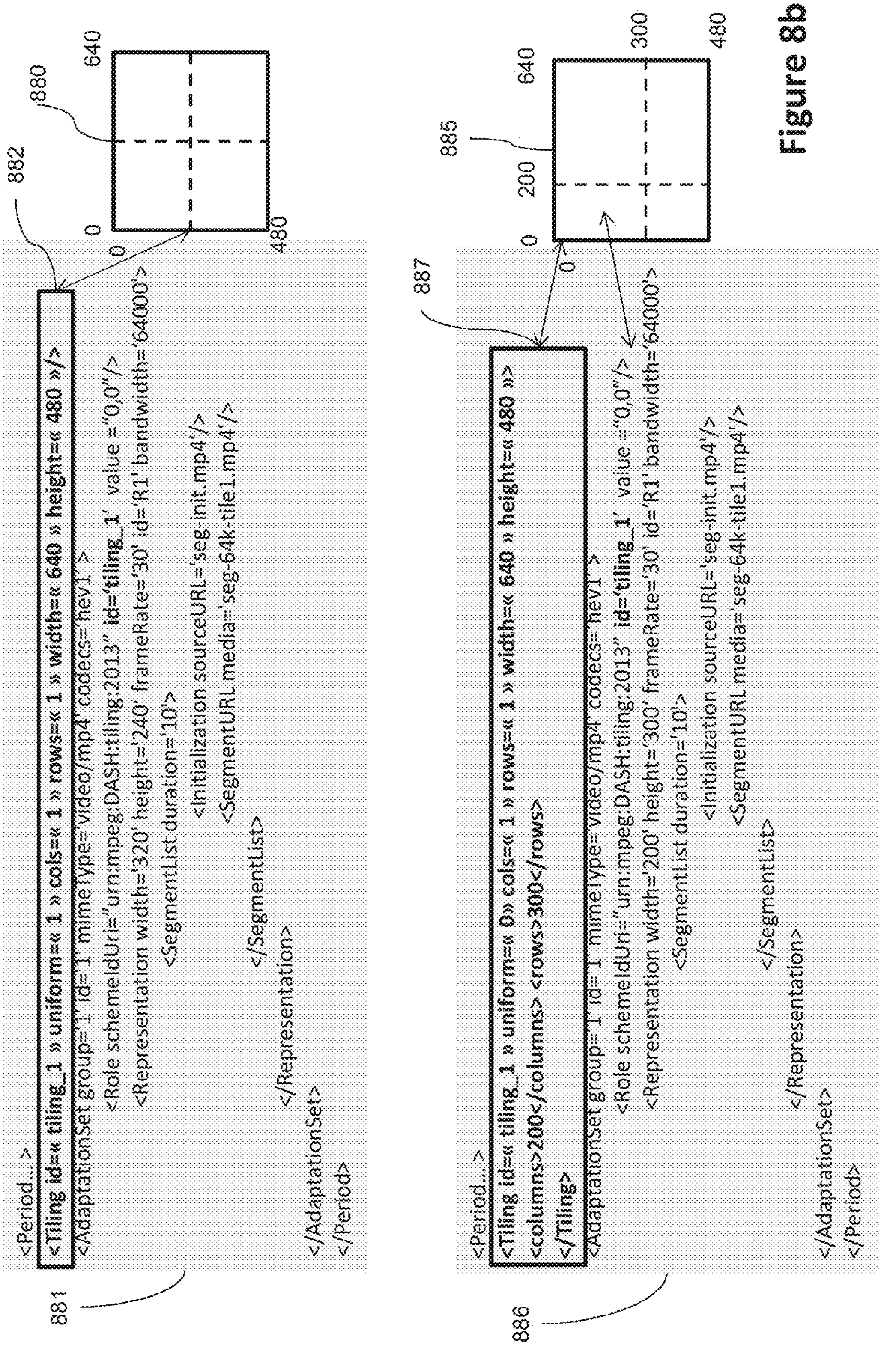

In FIG. 8*b*, portions of code 881 and 886 illustrate as example, such element to describe the tiling configuration. These portions of code 881 and 886 are related to two tiled video frames 880 and 885 schematically illustrated in the right part of the FIG. 8*b*.

Any tile representation coming from this tiling configuration can refer to it via the "id" attribute of the tiling "Role" element previously mentioned. The uniform attribute indicates whether the tiling is regular or not, direct translation of the uniform_spacing_flag HEVC flag. When set to 1, the following attributes cols (for columns) and rows indicate the number of tiles columns minus 1 and the number of tiles rows minus 1.

In the example referenced 880, there is only one tile row boundary and 1 tile column boundary. The two last attributes provide the dimensions width and height of the full-frame video. When the tiling is not uniform as on the tiled video frame 885, then the "tiling" element contains children elements that provide the positions in pixels of the tiles columns and rows (one element per dimension, as shown in a line 887). In case the tiling configuration changes along time, a new period of time (<Period>) is created. This new period contains the new tiling configuration.

In case the manifest describes via the "tiling" element multiple tiling configurations, the tiling applied to a given tile can be referenced via its "id" attribute by adding a new attribute in the Role describing the tile. For example: <Role schemeIdUri="urn:mpeg:DASH:tiling:2013" Id='tiling_1' value="0,0"/>. Then, there are two alternatives to inform streaming clients about the tiling configuration. This information is useful, for example to inform the user about the addressable spatial areas in the videos. The approach with attributes duplicates information for each tile. Consequently, it is less compact, but it has the benefit to keep all the tile related information in the same element. This offers robustness in case of transformations applied to the manifest by any intermediate node in content distribution networks.

Considering the robustness aspect and self-description of a tile via the "Role" element, it is also interesting to put in the "value" attribute the size information in addition to position information. In this embodiment, the "value" attribute specifies a coma-separated list of four integers, in the following order: the x and y position of the top-left corner and the width and height of a tile. For example: value="x, y, w, h" as in the FIG. 12 described later. The coordinate system used to express the position of a tile is a 2D coordinate system, where the origin is arbitrary but shall be the same for all representations sharing the same id for the tiling role. Additionally, the x-axis is assumed to be oriented towards the right of the screen and the y-axis oriented towards the bottom. The width and height may be used by a viewer to render multiple tiles and align them spatially.

Another embodiment proposes to indicate the positions and sizes of the tile by using the syntax for spatial fragments defined in the W3C MediaFragments URI 1.0. This leads to a "value" attribute like: value="#xywh=0,0,320,240" to describe the first tile in the picture 860 (see the FIG. 8*a*). This provides the advantage for streaming clients that also support the Media Fragments URI specification. Indeed, if for example, a Media Fragments URI is used to link to a video to display, the client with Media Fragments URI support will automatically match the "Representation" with the correct spatial fragment thus making easier the choice of the adaptation logic. Moreover, when the server also supports Media Fragment URIs, the streaming client can use the BaseURL in the MPD and put the value of the value attribute into a HTTP Range header as specified by the Media Fragments URI specification to directly request the corresponding tile. Another advantage of using Media Fragments URI syntax is that the so-formed URL can be bookmarked and distributed by the client so that any other Media Fragments URI client can access the same tile.

When each tile is described separately in its own "AdaptationSet" it is difficult for a client to identify to which full-frame video "Representation" it is related to. It was proposed earlier to use the special value="0:0" in the "Role" element describing the tile, i.e. the "tiling Role". However, the full-frame video can be described in the same way. The "Representation" of the tiles is annotated, i.e. using a "tiling" Role (not represented). In such case, the "tiling" Role associated to the "Representation" of the full-frame video has its "id" attribute set to the same value as the "id" attributes of the "tiling" Roles of the tiles composing this full-frame video. By default, when a tiling "Role" is associated to a video "Representation" without any value attribute, this "Representation" has to be considered as the full-frame video. To be more explicit this "Representation" can carry a value attribute. In such case, the x and y fields take 0, 0 as value for the top-left corner while w and h take the values of the width and height of the full-frame video. In case a "tiling" element is declared, the tiling Role for the full-frame video "Representation" can of course refer to this tiling via its "id" so that the relation from tile to full-frame video is explicit for the streaming clients. Any of the above description for full-frame video signaling has the advantage of avoiding ambiguities for the clients using the manifest. However, to remain as close as possible to the standard, we can also use the classical Role element with standard "alternate" and "main" fields respectively assigned to the adaptation set containing the tiles "Representation" and to the adaptation set containing the full-frame video "Representation". When all these Representations are declared in the same AdaptationSet, one ContentComponent element per Representation can be used to describe the respective Role of each Representation.

This is described more in detail in the FIG. 11. This example describes a HD video (Representation 'R0' in 1106) that is composed of four spatial tiles of 960×540 (Representations 1101, 1102, 1103, 1104). Each tile has its own "AdaptationSet" and associated "Representation" plus a "tiling" Role. There are only one set of four tiles which can be associated, identified by "TS1".

Two subsets 1105 are defined to indicate the alternative between the full-frame video in the first subset and any tile or composition of tiles from the second subset. It can be easily extrapolated from example of the FIG. 11, that when several "Representations" schemes are available for a given tile, for example in terms of bandwidth, the dynamic switching mechanism provided by DASH is not broken.

FIG. 9 is a complete example that illustrates the usage of the new scheme defined in the invention. This example takes the DASH standard (MPD) as reference. In this figure, a media presentation (video and audio media) is described. Two subsets are described:

the first one contains the adaptation sets with Id: '0', '1', '2' and '3', and the second one contains the adaptation sets tag Id: '4', '5' and '6'.

As mentioned above, the usage of subsets enables to specify that some adaptation sets cannot be streamed together. Adaptation sets of the second subset cannot be streamed with the adaptation sets of the first subset. In the first subset, audio and video representations (with and without the new scheme) are available. Such representations give to the client the possibility of streaming media data even if the scheme 'tiling' is not supported (the MPD syntax without the scheme is always understood).

In the first subset, the adaptation set that contains the first video representation is described by using a line 900:

<Role schemeIdUri="urn:mpeg:DASH:tiling:2013" Id="1" value="0:0"/>.

This line indicates that the representations associated to this adaptation set are non-tiled versions of the video (value="0:0").

A line with the scheme proposed in this invention is associated to the adaptation set that contains the audio media, 910:

<Role schemeIdUri="urn:mpeg:DASH:tiling:2013" Id="1"/>.

This line indicates that the audio media included in this adaptation set is related to the non-tiled version of the video. The optional field 'value="0:0"' could be also added but it is useless in this example.

In the second subset (adaptation set with Id="4", "5" and "6"), two video sub-tracks are described through the new scheme. The representation element related to the first tile is contained in the adaptation set with 'Id' equal to '4'. A line 920 that specifies the first video sub-track is:

<Role schemeIdUri="urn:mpeg:DASH:tiling:2013" Id="1" value="1:1"/>.

A line 930 that specifies the second video sub-track is:

<Role schemeIdUri="urn:mpeg:DASH:tiling:2013" Id="1" value="1:2"/>.

This line specifies that the representations that are included in the adaptation set contain the URL related to the first tile of the second line of tile.

A line 940 with the scheme proposed in the invention is associated to the adaptation set (of the second subset) that contains the audio media:

<Role schemeIdUri="urn:mpeg:DASH:tiling:2013" Id="1"/>.

This line indicates that the audio media included in this adaptation set is related to one of the tiled version of the video sub-tracks.

Figure 10:
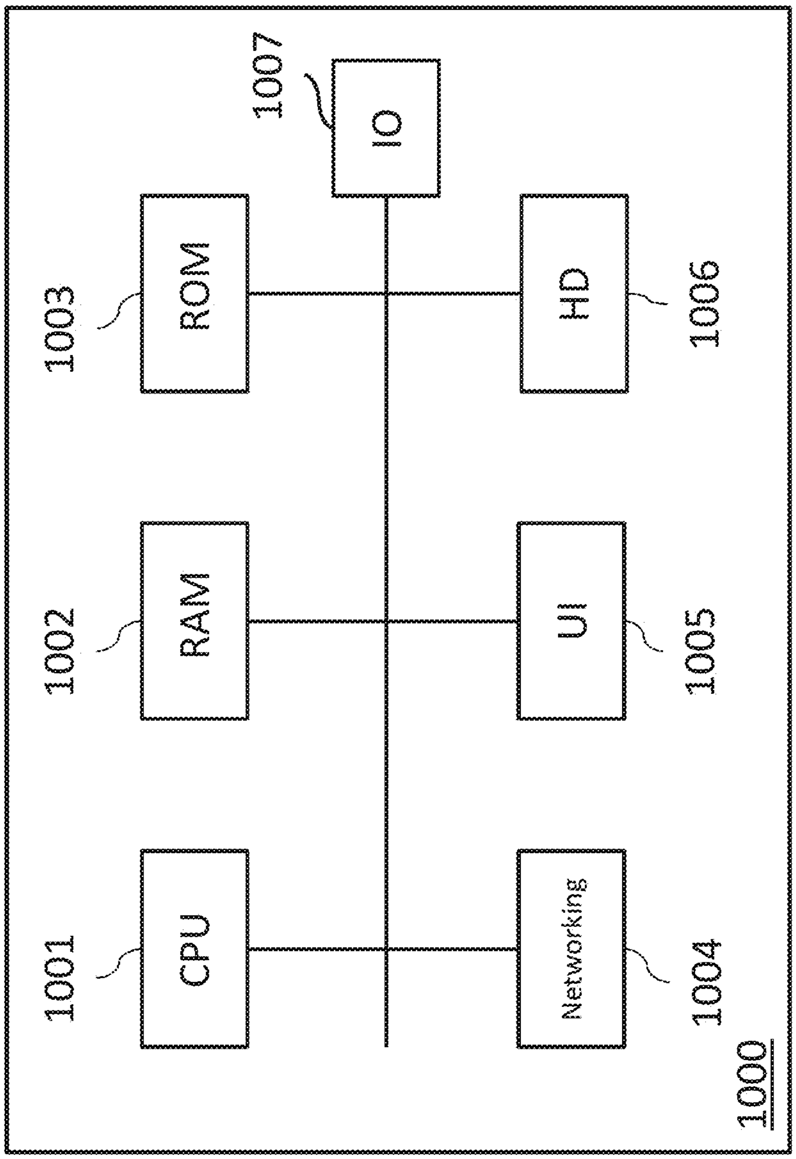
FIG. 10 is a schematic block diagram of a computing device for implementation of one or more embodiments of the invention.

FIG. 10 is a schematic block diagram of a computing device 1000 for implementation of one or more embodiments of the invention. The computing device 1000 may be a device such as a micro-computer, a workstation or a light portable device. The computing device 1000 comprises a communication bus connected to:

a central processing unit 1001, such as a microprocessor, denoted CPU;

a random access memory 1002, denoted RAM, for storing the executable code of the method of embodiments of the invention as well as the registers adapted to record variables and parameters necessary for implementing the method for reading and writing the manifests and/or for encoding the video and/or for reading or generating the Data under a given file format, the memory capacity thereof can be expanded by an optional RAM connected to an expansion port for example;

a read only memory 1003, denoted ROM, for storing computer programs for implementing embodiments of the invention;

a network interface 1004 is typically connected to a communication network over which digital data to be processed are transmitted or received. The network interface 1004 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1001;

a user interface 1005 for receiving inputs from a user or to display information to a user;

a hard disk 1006 denoted HD;

an I/O module 1007 for receiving/sending data from/to external devices such as a video source or display.

The executable code may be stored either in read only memory 1003, on the hard disk 1006 or on a removable digital medium such as for example a disk. According to a variant, the executable code of the programs can be received by means of a communication network, via the network interface 1004, in order to be stored in one of the storage means of the communication device 1000, such as the hard disk 1006, before being executed.

The central processing unit 1001 is adapted to control and direct the execution of the instructions or portions of software code of the program or programs according to embodiments of the invention, which instructions are stored in one of the aforementioned storage means. After powering on, the CPU 1001 is capable of executing instructions from main RAM memory 1002 relating to a software application after those instructions have been loaded from the program ROM 1003 or the hard-disc (HD) 1006 for example. Such a software application, when executed by the CPU 1001, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone or a tablet that acts as a remote controller for a TV, for example to zoom in onto a particular region of interest. It can also be used from the same devices to have personalized browsing experience of the TV program by selecting specific areas of interest. Another usage from these devices and methods by a user is to share with other connected devices some selected subparts of his preferred videos. It can also be used in smartphone or tablet to monitor what happened in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for streaming data corresponding to a video, each of a plurality of frames of the video being divided into n spatial tiles, n being an integer, the method comprising:

transmitting, by a server, a description file to a client device, said description file including data about a spatial position of each of the n spatial tiles and including data about at least n URLs corresponding to the n spatial tiles, determining by the client device one or more URLs according to the data about the spatial position included in the description file, receiving from the client device, by the server, one or more request messages for requesting one or more spatial tiles, each request message comprising one of the URLs determined by the client device, and transmitting to the client device, by the server, video data corresponding to the one or more spatial tiles, in response to the one or more request messages.

2. A method according to claim 1, wherein the description file further comprises a URL corresponding to the full video, and if the client device does not determine any URL corresponding to the n spatial tiles, the server receives from the client device a request message comprising the URL corresponding to the full video and transmits, to the client device, video data corresponding to the full video in response to the request message.

3. A method according to claim 1, wherein the video is a scalable video comprising a base layer and at least one enhancement layer, said n spatial tiles corresponding to an enhancement layer, and said video further comprising a base layer video data, said description file further comprising the URL of the base layer video data, and if the client device selects at least one URL according to one of said n spatial tiles, it also selects the URL of the base layer video data, and the server further receives from the client device one request message for requesting the base layer video data, said request message including the URL of the base layer video data, and the server further transmits, to the client device, video data corresponding to the requested base layer, in response to the request message.

4. A method according to claim 1, wherein the video is a scalable video comprising a base layer and at least one enhancement layer, said n spatial tiles corresponding to an enhancement layer, and each frame of the base layer also being divided into n spatial tiles, each tile of the base layer corresponding to a tile in the enhancement layer, in order to create n independent base layer spatial tile video data, and if the client device selects at least one URL according to one of said n spatial tiles, it also selects the URLs of the corresponding base layer spatial tiles video data, and the server further receives from the client device one request message for requesting the base layer spatial tiles video data, said request message including the URLs of the base layer spatial tiles video data, and the server further transmits, to the client device, video data corresponding to the requested base layer spatial tiles video data, in response to the request message.

5. A method according to claim 1, wherein the configuration of the n spatial tiles is defined in the description file by a grid subdivided into a given number of rows and columns, each one having a pre-determined height and width.

6. A method according to claim 5, wherein the configuration of the n spatial tiles defines spatial tiles having an equal area or a non-equal area.

7. The method according to claim 1, wherein the one or more URLs are determined by the client device based on the spatial position included in the description file.

8. The method according to claim 1, wherein the one or more URLs are determined based on both of the data about the spatial position included in the description file and a user operation for selecting of a region to be obtained from the server.

9. A method for providing data by a server device to a client device, said data corresponding to a video, each of a plurality of frames of the video being divided into n spatial tiles, n being an integer, the method comprising:

transmitting a description file to the client device, said description file including data about the spatial position of each of the n spatial tiles, and including data about at least n URLs corresponding to the n spatial tiles, and transmitting, to the client device, data corresponding to one or more spatial tiles of the video in response to one or more request messages from the client devices, each request message comprising one of the URLs.

10. A method according to claim 9, wherein the description file further comprises a URL designating video data corresponding to the full video, and the server transmits, to the client device, video data corresponding to the full video based on a client device requests comprising the URL of the full video data.

11. A method according to claim 9, wherein the video is a scalable video comprising a base layer and at least one enhancement layer, said n spatial tiles corresponding to an enhancement layer, and said video further comprising a base layer, said description file further comprising the URL of the base layer video data, and the server further transmits, to the client device, video data corresponding to the base layer based on a client device requests comprising the URL of the base layer video data.

12. A method according to claim 9, wherein the video is a scalable video comprising a base layer and at least one enhancement layer, said n spatial tiles corresponding to an enhancement layer, and each frame of the base layer also being divided into n spatial tiles, each tile of the base layer corresponding to a tile in the enhancement layer, in order to create n independent base layer video data, said description file further comprising the URL of the base layer spatial tiles video data, and the server further transmits, to the client device, video data corresponding to the base layer spatial tiles video data based on a client device requests comprising the URL of the base layer spatial tiles video data.

13. A method according to claim 9, wherein the configuration of the n spatial tiles is defined in the description file by a grid subdivided into a given number of rows and columns, each one having a pre-determined height and width.

14. A method according to claim 13, wherein the configuration of the n spatial tiles defines spatial tiles having an equal area or a non-equal area.

15. A method according to claim 13, wherein if the spatial tiles have a nonuniform area the grid is specified by its number of rows and columns and the positions of the borders of the rows and the columns.

16. A method according to claim 9, wherein the data are transmitted according to the DASH standard, said description file being a Media Presentation Description file.

17. A method according to claim 16, wherein the configuration of the n spatial tiles being defined for a predefined period of time by using a syntax element relative to an entire period of time.

18. A method according to claim 17, the description file comprising a set of parameters defined for each video data for every period of time, the set of parameters including a descriptor which incorporates data about:

a. the type of the video data: video track or video sub-track, and/or b. if the track is a video sub-track, the position of the spatial tile and the configuration of the n spatial tiles.

19. A method according to claim 18, wherein if the video data is a video sub-track, the descriptor further comprise a scheme to specify the position of the considered tile relative to the configuration of the n tiles.

20. A method according to claim 19, wherein the position of the spatial tile being indicated by referring to the indexes of the rows and the columns of the grid.

21. A method according to claim 19, wherein the position of the spatial tile being indicated by referring to the position in pixels of the top-left corner of the tile and the width and height of the tile.

22. A method according to claim 19, wherein the position of the spatial tile being indicated by positions in a specified coordinates system.

23. A method according to claim 19, wherein the position of the spatial tile being expressed as a spatial Media Fragments.

24. A method according to claim 17, wherein the description file comprises for every period of time, a set of parameters being defined for each tile, the set of parameters including a descriptor called a Role element which incorporates data about:

a. the type of the video data: video track or video sub-track, and/or b. if the video data is a video sub-track, a reference to the configuration of the n spatial tiles.

25. A method according to claim 9, further comprising preliminarily to the step of generating a description file:

acquiring data corresponding to the video, compressing the acquired data, encapsulating the compressed data, said encapsulating comprising:

generating a given number of media segment files, each one comprising the data associated to the video and the n spatial tiles for a given period of time, and generating an initialization segment associated to the media files segments, which comprises initialization data about the video data and the video sub-tracks.

26. A method according to claim 9, wherein the video data includes m video tracks representing the same content, m being an integer, each of the m video tracks having a given resolution, and each frame of each video track being divided into n spatial tiles, in order to create m<*>n independent video sub-tracks.

27. A method according to claim 9, wherein the description file comprises parameters for video sub-tracks, the parameters including data about the possible or forbidden associations of the different video sub-tracks, said possible or forbidden associations being indicated by an identifier attribute if the data are streamed according to the DASH standard.

28. A non-transitory computer-readable storage medium storing instructions of a computer program for implementing a method according to claim 9.

29. A method for obtaining data corresponding to a video by a client device, each of a plurality of frames of the video being divided into n spatial tiles, n being an integer, the method comprising:

receiving a description file including data about a spatial position of each of the n spatial tiles and including data about at least n URLs corresponding to the n spatial tiles, determining one or more URLs according to the data about the spatial position included in the description file, and transmitting one or more request messages for requesting one or more spatial tiles of the video, each request message comprising one of the URLs determined by the client device, receiving the one or more spatial tiles of the video requested by the request messages.

30. A method according to claim 29, wherein the description file further comprises a URL designating video data corresponding to the full video, and if the client device does not select any of said n spatial tiles, the method further comprises sending a request message for requesting the full video data and receiving video data corresponding to the requested full video data, in response to the request message.

31. A method according to claim 29, wherein the video is a scalable video comprising a base layer and at least one enhancement layer, said n spatial tiles corresponding to an enhancement layer, and said video further comprising a base layer video data, said description file further comprising the URL of the base layer video data, and if the client device chooses one of said n spatial tiles, and the method further comprises:

obtaining by the client device the URL of the base layer video data, sending request message which includes the URL of the base layer video data, and receiving video data corresponding to the requested base layer video data, in response to the request message.

32. A method according to claim 29, wherein the video is a scalable video comprising a base layer and at least one enhancement layer, said n spatial tiles corresponding to an enhancement layer, and each frame of the base layer also being divided into n spatial tiles, each tile of the base layer corresponding to a tile in the enhancement layer, in order to create n independent base layer spatial tile video data, said description file further comprising the URLs of the base layer spatial tile video data, and if the client device chooses one of said n spatial tile, and the method further comprises:

obtaining by the client device the URLs of the base layer spatial tile video data, sending request message which includes the URLs of the base layer spatial tile video data, and receiving video data corresponding to the requested base layer spatial tile video data, in response to the request message.

33. A method according to claim 29, wherein the configuration of the n spatial tiles is defined in the description file by a grid subdivided into a given number of rows and columns, each one having a pre-determined height and width.

34. A method according to claim 33, wherein the configuration of the n spatial tiles defines spatial tiles having an equal area or a non-equal area.

35. A method according to claim 33, wherein if the spatial tiles have a nonuniform area the grid is specified by its number of rows and columns and the positions of the borders of the rows and the columns.

36. A method according to claim 29, wherein the data are defined according to the DASH standard, said description file being a Media Presentation Description file.

37. A method according to claim 36, wherein the configuration of the n spatial tiles being defined for a pre-defined period of time by using a syntax element relative to an entire period of time.

38. A method according to claim 37, the description file comprising a set of parameters defined for each video data for every period of time, the set of parameters including a descriptor which incorporates data about:

a. the type of the video data: video track or video sub-track, and/or b. if the video data is a video sub-track, the position of the spatial tile and the configuration of the n spatial tiles.

39. A method according to claim 38, wherein if the video data is a video sub-track, the descriptor further comprise a scheme to specify the position of the considered tile relative to the configuration of the n tile.

40. A method according to claim 39, wherein the position of the spatial tile being indicated by referring to the indexes of the rows and the columns of the grid.

41. A method according to claim 39, wherein the position of the spatial tile being indicated by referring to the position in pixels of the top-left corner of the tile and the width and height of the tile.

42. A method according to claim 39, wherein the position of the spatial tile being indicated by positions in a specified coordinates system.

43. A method according to claim 39, wherein the position of the spatial tile being expressed as a spatial Media Fragments.

44. A method according to claim 37, wherein the description file comprising for every period of time, a set of parameters being defined for each tile and, the set of parameters including a descriptor called a Role element which incorporates data about:

a. the type of the video data: video track or video sub-track, and/or b. if the video data is a video sub-track, a reference to the configuration of the n spatial tiles.

45. A method according to claim 29, wherein the video data corresponds to m videos representing the same content, m being an integer, each of the m videos having a different resolution, and each frame of each video being divided into n spatial tiles, in order to create m<*>n independent video data.

46. A method according to claim 29, wherein the description file comprises parameters for video data, the parameters including data about the possible or forbidden associations of the different video data, said possible or forbidden associations being indicated by an identifier attribute if the data are streamed according to the DASH standard.

47. A method according to claim 29, wherein the received video data comprises:

a given number of video segment files, each one comprising the data associated to the video and the n spatial tiles video data for a given period of time, and an initialization segment associated to the media files segments, which comprises initialization data about the video data and the spatial tiles video data.

48. A method according to claim 47, wherein the initialization data comprises values indicating the width and the height of each spatial tile video data.

49. A method according to claim 48, wherein the initialization data further comprises a transformation matrix which enables the display of each spatial tile video data at the right position.

50. A non-transitory computer-readable storage medium storing instructions of a computer program for implementing a method according to claim 29.

51. The method according to claim 29, wherein the one or more URLs are determined by the client device based on the spatial position included in the description file.

52. The method according to claim 29, wherein the one or more URLs are determined based on both of the data about the spatial position included in the description file and a user operation for selecting of a region to be obtained from the server.

53. A server apparatus for providing data to a client apparatus, said data corresponding to a video each of a plurality of frames of the video being divided into n spatial tiles, n being an integer, said server apparatus including a memory and a processor coupled to the memory which executes the following:

generating a description file, said description file including data about a spatial position of each of the n spatial tiles, and including data about at least n URLs corresponding to the n spatial tiles, transmitting said description file to the client apparatus, and transmitting video data corresponding to a given number of video data based on one or more client apparatus or client apparatus user's requests, each request comprising one of the URLs.

54. A client apparatus for obtaining data corresponding to a video, each of a plurality of frames of the video being divided into n spatial tiles, n being an integer, said client apparatus including a memory and a processor coupled to the memory which executes the following:

receiving a description file including data about a spatial position of each of the n spatial tiles and including data about at least n URLs corresponding to the n spatial tiles, one or more URLs according to the data about the spatial position included in the description file, and transmitting one or more request messages for requesting one or more spatial tiles of the video, each request message comprising one of the URLs determined by the client device, receiving the one or more spatial tiles of the video corresponding to the requested video sub-tracks, in response to the request messages.

* * * * *